US009843109B2

(12) United States Patent
Nakamura et al.

(10) Patent No.: US 9,843,109 B2
(45) Date of Patent: Dec. 12, 2017

(54) ANTENNA DEVICE AND SIGNAL PROCESSING METHOD

(71) Applicant: NISSAN MOTOR CO., LTD., Yokohama-Shi, Kanagawa (JP)

(72) Inventors: Mitsunori Nakamura, Kanagawa (JP); Hiroshi Satoh, Kanagawa (JP); Shinichi Nishioka, Kanagawa (JP); Hidekazu Nishiuchi, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 15/025,195

(22) PCT Filed: Jul. 14, 2014

(86) PCT No.: PCT/JP2014/068693
§ 371 (c)(1),
(2) Date: Mar. 25, 2016

(87) PCT Pub. No.: WO2015/045573
PCT Pub. Date: Apr. 2, 2015

(65) Prior Publication Data
US 2016/0240931 A1 Aug. 18, 2016

(30) Foreign Application Priority Data
Sep. 27, 2013 (JP) .................................. 2013-200794

(51) Int. Cl.
*H01Q 21/24* (2006.01)
*H01Q 3/22* (2006.01)
(Continued)

(52) U.S. Cl.
CPC ............. *H01Q 21/24* (2013.01); *G01S 7/024* (2013.01); *G01S 7/03* (2013.01); *G01S 7/352* (2013.01);
(Continued)

(58) Field of Classification Search
CPC ........... G01S 13/34; G01S 13/38; G01S 13/40
See application file for complete search history.

(56) References Cited

U.S. PATENT DOCUMENTS 5,760,397 A 6/1998 Huguenin et al.
7,304,603 B2 * 12/2007 Reed ....................... G01S 7/024
342/160
(Continued)

FOREIGN PATENT DOCUMENTS

| CN | 1500319 A | 5/2004 |
| JP | 2000088944 A | 3/2000 |

(Continued)

*Primary Examiner* — Gregory C. Issing
(74) *Attorney, Agent, or Firm* — Young Basile Hanlon & MacFarlane, P.C.

(57) ABSTRACT

An antenna device includes a plurality of antenna elements respectively configured to receive incident waves coming from an object, a modulating unit respectively configured to modulates a first received signal of the incident waves output from the antenna elements into a second received signal, the second received signals having a plurality of different frequencies and phases corresponding to polarization directions of the received incident waves, a synthesizing unit configured to synthesize the plurality of second received signals and generates a synthetic signal, a signal processing unit, configured to perform predetermined signal processing on the synthetic signal, and an extracting unit configured to extract third received signals for each frequency and each phase from the synthetic signal on which has been performed the predetermined signal processing.

16 Claims, 20 Drawing Sheets

(51) Int. Cl.

| | |
|---|---|
| *G01S 7/03* | (2006.01) |
| *G01S 7/02* | (2006.01) |
| *G01S 7/35* | (2006.01) |
| *G01S 13/34* | (2006.01) |
| *H01Q 21/06* | (2006.01) |
| *G01S 13/58* | (2006.01) |
| *G01S 13/93* | (2006.01) |

(52) U.S. Cl.
CPC ............ *G01S 13/34* (2013.01); *G01S 13/584* (2013.01); *G01S 13/931* (2013.01); *H01Q 3/22* (2013.01); *H01Q 21/061* (2013.01)

(56) References Cited

U.S. PATENT DOCUMENTS

| | | | |
|---|---|---|---|
| 7,339,520 B2* | 3/2008 | Chang | .................. H01Q 1/3275 |
| | | | 342/359 |
| 9,041,596 B2 | 5/2015 | Kuwahara et al. | |
| 2004/0095278 A1 | 5/2004 | Kanemoto et al. | |
| 2012/0268314 A1 | 10/2012 | Kuwahara et al. | |
| 2012/0274501 A1 | 11/2012 | Kuwahara et al. | |

FOREIGN PATENT DOCUMENTS

| | | |
|---|---|---|
| JP | 3428374 B2 | 7/2003 |
| JP | 2012168156 A | 9/2012 |
| WO | 2006085360 A1 | 8/2006 |

\* cited by examiner (A)

|  | FREQUENCY | PHASE |
|---|---|---|
| FIRST ROW SIDE OSCILLATOR $OS_{H1}$ | 210kHz | 0° |
| FIRST PHASE SHIFTER PH1 | 210kHz | 60° |
| SECOND PHASE SHIFTER PH2 | 210kHz | 120° |
| SECOND ROW SIDE OSCILLATOR $OS_{H2}$ | 215kHz | 60° |
| THIRD PHASE SHIFTER PH3 | 215kHz | 120° |

ANTENNA DEVICE AND SIGNAL PROCESSING METHOD

CROSS REFERENCE TO RELATED APPLICATION

The present application claims priority to Japanese Patent Application No. 2013-200794 filed on Sep. 27, 2013, incorporated by reference in its entirety.

TECHNICAL FIELD

The present invention relates to an antenna device and a signal processing method.

BACKGROUND

In the prior art, an antenna device has been known. The antenna device includes a plurality of receiving antenna elements and performs predetermined signal processing such as a low frequency amplification process on received signals output from the receiving antenna elements (See Japanese Patent Application 2012-168156).

However, in the prior art, since each of the plurality of receiving antenna elements needs a circuit for performing the signal processing on the received signal, there is a problem in that the size of the entire antenna device is large.

SUMMARY

A problem to be solved by the present invention is to provide an antenna device which is capable of implementing space saving.

The present invention solves the above problem as below. An antenna device according to the present invention includes a modulating unit configured to modulate a first received signal of incident waves received by an antenna element into second received signal, the second received signals having a plurality of different frequencies and phases corresponding to polarization directions of the incident waves received by the antenna elements, a synthesizing unit configured to synthesize a plurality of the second received signals respectively modulated by the modulating units and generate a synthetic signal, a signal processing unit configured to perform predetermined signal processing on the synthetic signal, and an extracting unit configured to extract the third received signal from the synthetic signal that has been performed the predetermined signal processing, each of the third received signals having a frequency and a phase equal to the frequency and the phase of the second received signal modulated by the modulating unit.

According to the present invention, instead of performing signal processing on each of a plurality of received signals received by a plurality of antenna elements, first received signals of incident waves received by a plurality of antenna elements are modulated into second received signals having a plurality of different frequencies and phases corresponding to polarization directions of the incident waves received by the antenna elements, and a plurality of the second received signals modulated to have the different frequencies and phases are synchronized into one synthetic signal. Since predetermined signal processing is performed on one synthetic signal, it is possible to commonalize a signal processing unit (signal processing circuit) for performing signal processing, and thus it is possible to implement the space saving of the antenna device.

BRIEF DESCRIPTION OF THE DRAWINGS

FIG. 13 is a table for describing an amplitude modulation method of a received signal according to the fifth embodiment;

DETAILED DESCRIPTION OF THE EMBODIMENTS

Hereinafter, embodiments of the present invention will be described with reference to the appended drawings.

Figure 1:
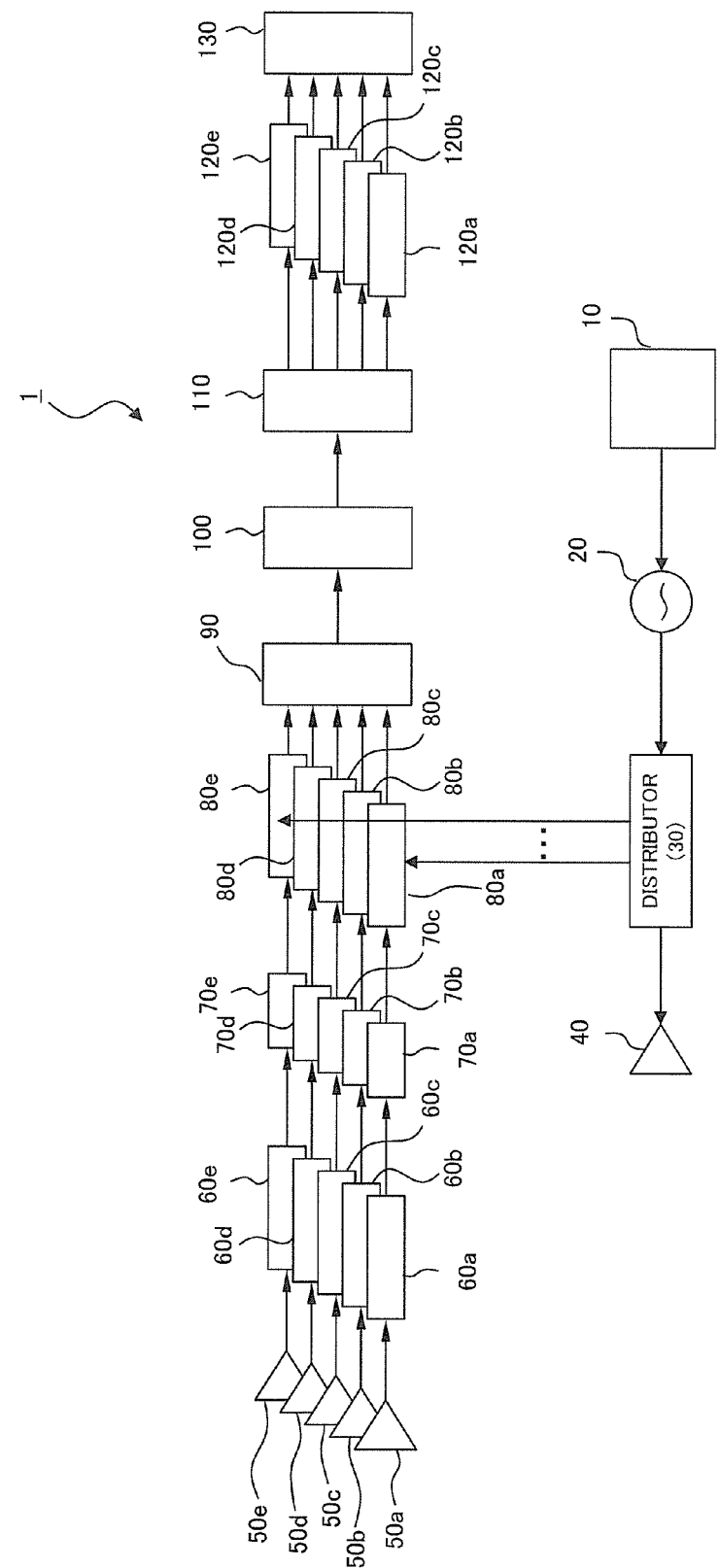
FIG. 1 is a block diagram illustrating a configuration of an antenna device according to a first embodiment.

FIG. 1 is a block diagram illustrating a configuration of an antenna device 1 according to a first embodiment. The antenna device 1 according to the first embodiment includes a transmission signal generating unit 10, a voltage controlled oscillator 20, a distributor 30, a transmission antenna element 40, receiving antenna elements 50a to 50e, amplitude modulators 60a to 60e, high frequency amplifiers 70a to 70e, detectors 80a to 80e, a synthesizer 90, a low frequency amplifier 100, an A/D converter 110, frequency band extraction filters 120a to 120e, and a control device 130 as illustrated in FIG. 1.

The transmission signal generating unit 10 generates a received signal according to an FMCW scheme. Specifically, the transmission signal generating unit 10 generates a received signal of triangular waves form having a predetermined cycle so that a frequency of the received signal is linearly increased and decreased with the passage of time. The received signal generated by the transmission signal generating unit 10 is output to the voltage controlled oscillator 20.

The voltage controlled oscillator 20 generates a high frequency signal of a millimeter band serving as a transmission signal. Specifically, the voltage controlled oscillator 20 generates the transmission signal whose frequency has been modulated according to the received signal output from the transmission signal generating unit 10.

The distributor 30 bifurcates the transmission signal input from the voltage controlled oscillator 20, and outputs the bifurcated transmission signals to the transmission antenna element 40 and the detectors 80a to 80e.

The transmission antenna element 40 radiates (outputs) transmission waves to an object on the basis of the transmission signal output from the distributor 30. In FIG. 1, only one transmission antenna element 40 is illustrated, but a plurality of transmission antenna elements 40 may be installed. The transmission antenna element 40 may also function as the receiving antenna elements 50a to 50e which will be described later.

Figure 5:
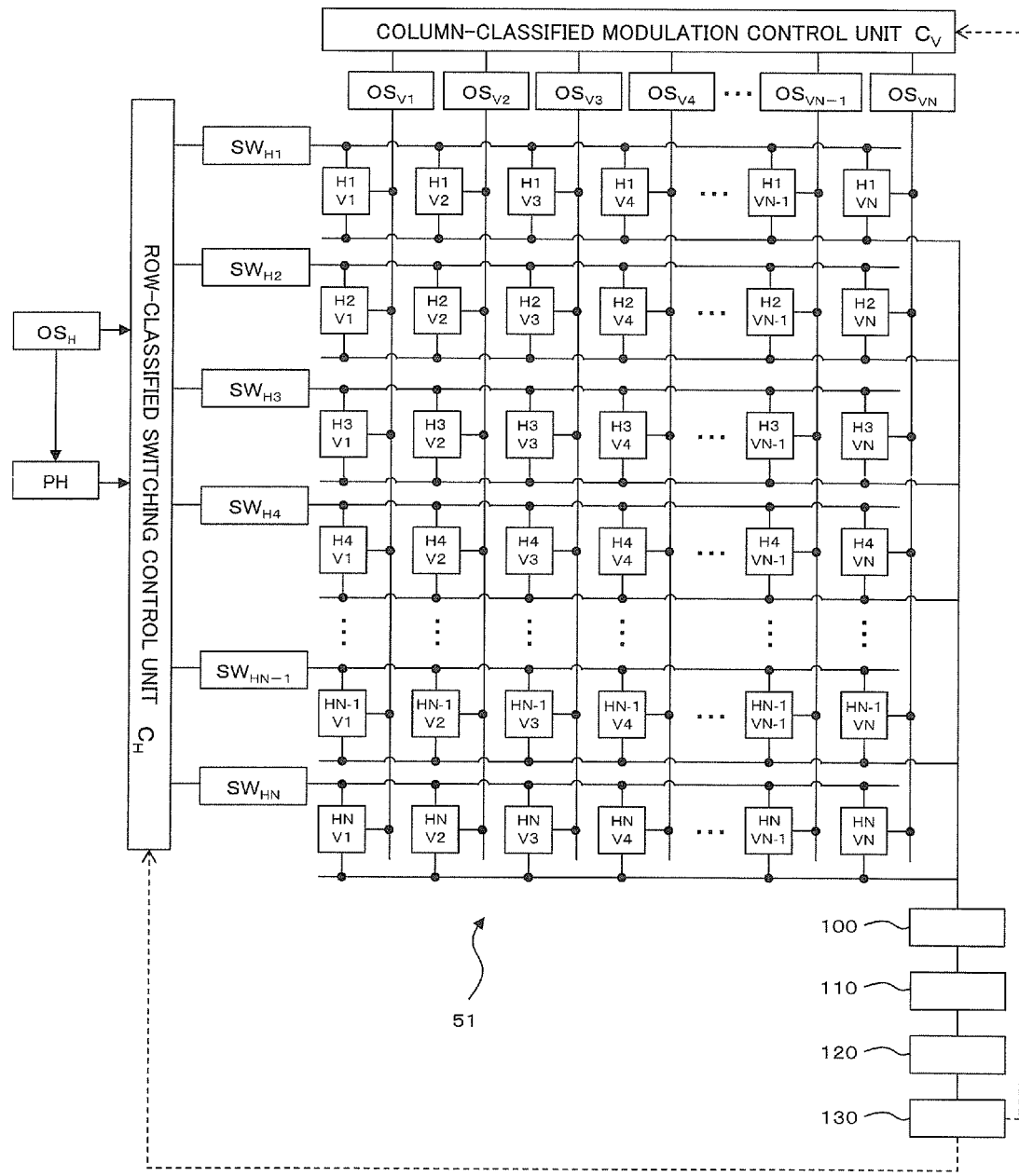
FIG. 5 is a diagram illustrating a circuit configuration of an antenna device according to the first embodiment.

The transmission waves transmitted through the transmission antenna element 40 is reflected by the object and returned as reflected waves. The reflected waves is received as incident waves by the receiving antenna elements 50a to 50e. In the present embodiment, the five receiving antenna elements 50a to 50e are illustrated in FIG. 1, but the number of receiving antenna elements 50a to 50e is not limited. For example, as illustrated in FIG. 5 which will be described later, the number of receiving antenna elements may be larger than 5 (the same applies to the high frequency amplifiers 70a to 70e, the amplitude modulators 60a to 60e, the detectors 80a to 80e, and the frequency band extraction filters 120a to 120e illustrated in FIG. 1 as well). The received signals of the incident waves received by the receiving antenna elements 50a to 50e respectively are output to the amplitude modulators 60a to 60e installed corresponds to the receiving antenna elements 50a to 50e.

Further, as will be described later, the receiving antenna elements 50a to 50e according to the present embodiment include a first receiving antenna element that mainly receives incident waves of a vertical polarized component and a second receiving antenna element that mainly receives incident waves of a horizontal polarized component. In the present embodiment, as will be described later, an array antenna 51 is provided in which the receiving antenna elements 50a to 50e are arranged in a two dimension form.

Figure 2:
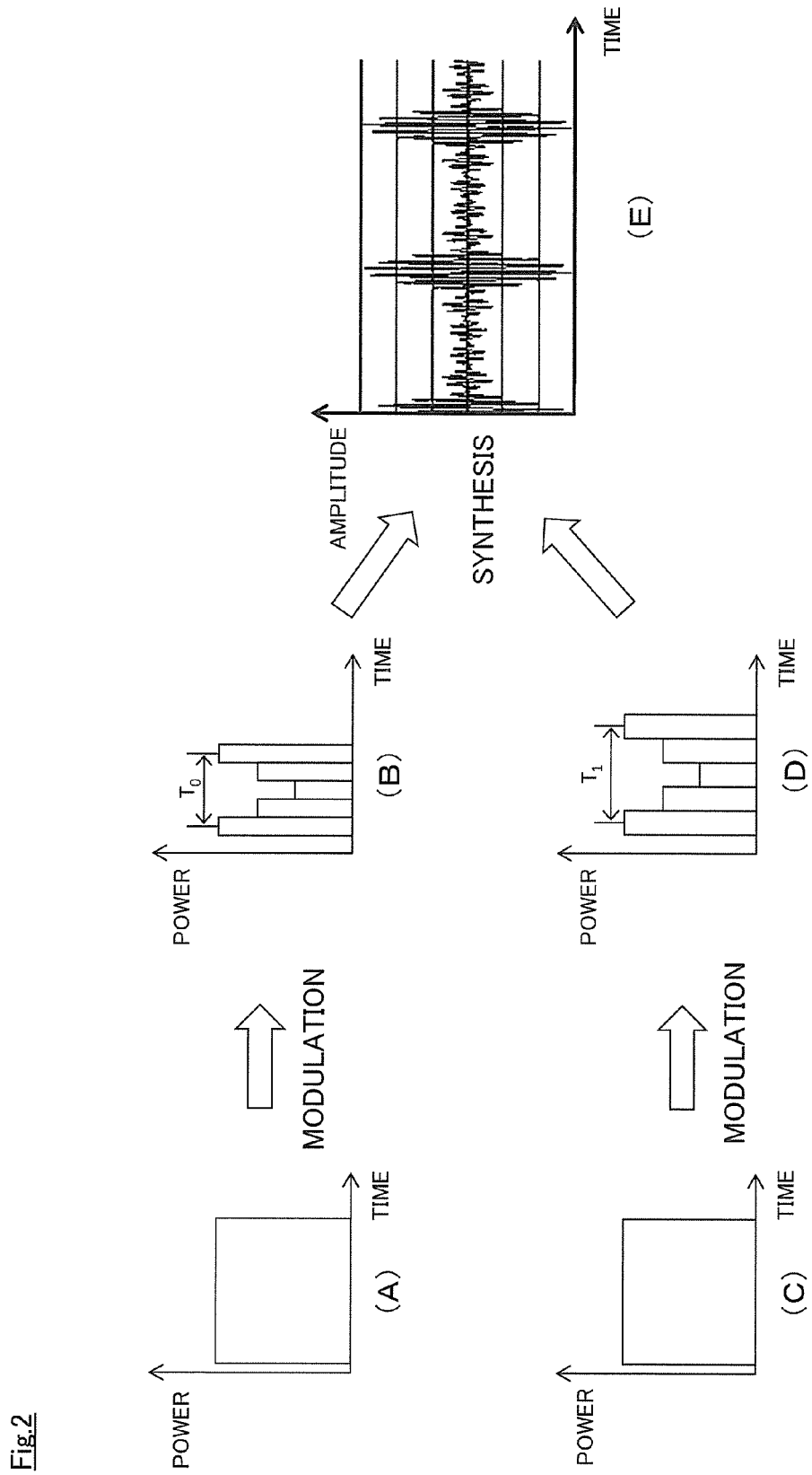
FIGS. 2(A) to 2(E) are diagrams for describing a synthesis process of received signals according to the first embodiment.

The amplitude modulators 60a to 60e modulate the received signals output from the receiving antenna elements 50a to 50e into signals having different frequencies by changing the amplitudes of the received signals output from the receiving antenna elements 50a to 50e so that the amplitudes of the received signals have different periods. Here, FIG. 2(A) illustrates the received signal output from one receiving antenna element 50a, and FIG. 2(C) illustrates the received signal output from another receiving antenna element 50b. FIG. 2(B) illustrates a received signal obtained by performing an amplitude modulation process on the received signal output in FIG. 2(A), and FIG. 2(D) illustrates a received signal obtained by performing an amplitude modulation process on the received signal output in FIG. 2(C).

For example, among the amplitude modulators 60a to 60e, the amplitude modulator 60a modulates the received signal output from the receiving antenna element 50a into a received signal corresponding to a frequency $f_0$ by modulating the amplitude of the received signal output from the receiving antenna element 50a so that the amplitude of the received signal have a period $T_0$ as illustrated in FIG. 2(B). Further, for example, among the amplitude modulators 60a to 60e, the amplitude modulator 60b modulates the received signal output from the receiving antenna element 50b into a received signal having a frequency $f_1$ lower than the frequency $f_0$ by modulating the amplitude of the received signal received by the receiving antenna element 50b so that the amplitude of the received signal have a period $T_1$ larger than the period $T_0$ as illustrated in FIG. 2(D). Similarly, the amplitude modulators 60c to 60e modulate the received signals output from the receiving antenna elements 50c to 50e into received signals having different frequencies by modulating the amplitude of the received signals output from the receiving antenna elements 50c to 50e.

Further, the amplitude modulators 60a to 60e change the amplitudes of the received signals so that the integration value of the amplitudes of the received signals output from the receiving antenna elements 50a to 50e is equal to the integration value of the amplitudes of the received signals that have undergone the amplitude modulation process by the amplitude modulators 60a to 60e. For example, when the power of the received signal illustrated in FIG. 2(A) is 100, the amplitude modulator 60a modulates the amplitude of the received signal so that the integration value obtained by integrating the amplitudes of the received signals having the frequency $f_0$ illustrated in FIG. 2(B) becomes 100.

Figure 3:
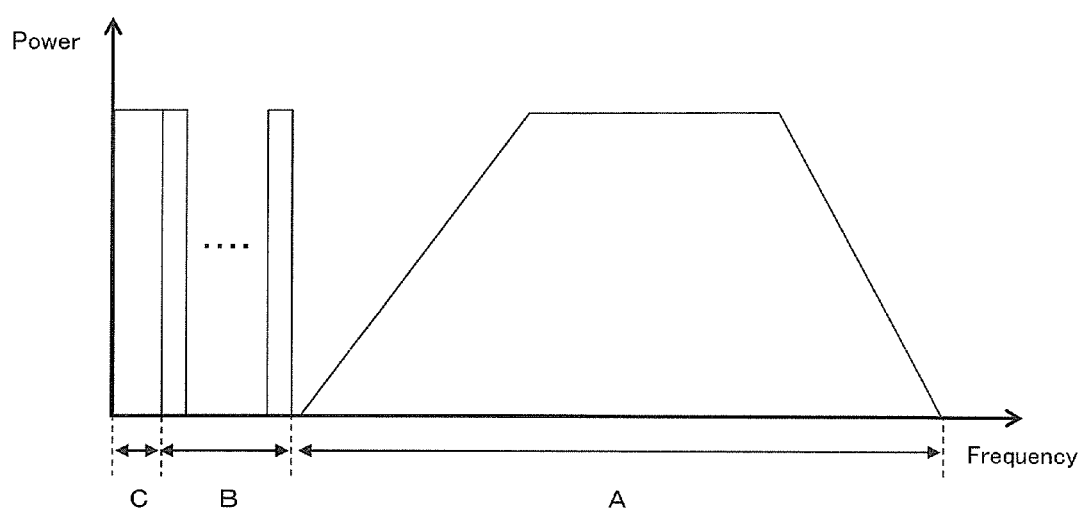
FIG. 3 is a diagram for describing an amplitude modulation method of a received signal by an amplitude modulator.

Further, a frequency band into which the amplitude modulators 60a to 60e modulate received signals is decided as a modulation frequency band in advance. The amplitude modulators 60a to 60e perform the modulation process on the received signals so that the frequency of the received signal is equal to a frequency in the modulation frequency band. Here, FIG. 3 is a diagram for describing an amplitude modulation method performed by the amplitude modulators 60a to 60e. In FIG. 3, A indicates a frequency band of the incident waves received by the receiving antenna elements 50a to 50e, and B indicates the modulation frequency band that can be allocated by the amplitude modulators 60a to 60e. C is a frequency band that is prohibited from being allocated by the amplitude modulators 60a to 60e.

In the present embodiment, an upper limit value of the modulation frequency band is set as follows. For example, an upper limit value of a frequency at which no waveform distortion occurs in the detectors 80a to 80e may be set as the upper limit value of the modulation frequency band. Further, a frequency (for example, 1 GHz or 1 MHz) that is 1/10 of a sampling frequency of the A/D converter 110 may be set as the upper limit value of the modulation frequency band.

On the other hand, in the present embodiment, a lower limit value of the modulation frequency band may be set on the basis of a receiving period of the received signal or a modulating period of an amplitude value by the amplitude modulators 60a to 60e. For example, when the received signal is received for every one millisecond or when an amplitude adjustment process is performed by the amplitude modulators 60a to 60e for every one millisecond, 1 Hz that is a reciprocal of the receiving period of the received signal or a reciprocal of the modulating period of the amplitude value by the amplitude modulators 60a to 60e may be set as the lower limit value of the modulation frequency band.

Further, in the modulation frequency band, the number of channels in which the received signal can be modulated (the number of allocatable frequencies) may be obtained by following formula, that is, (the upper limit value–the lower limit value)/the lower limit value. For example, when the lower limit value of the modulation frequency band is 1 kHz, and the upper limit value of the modulation frequency band is 1 MHz (1000 kHz), 999 (=(1000 kHz–1 kHz)/1 kHz) is obtained as the number of channels. In other words, in this case, it is possible to set up to 999 as the number of receiving antenna elements, and it is possible to modulate the received signals obtained through the receiving antenna elements $50_1$ to $50_{999}$ into signals of different frequencies. Then, the received signals modulated by the amplitude modulators 60a to 60e are output to the high frequency amplifiers 70a to 70e respectively corresponding to the amplitude modulators 60a to 60e.

The high frequency amplifiers 70a to 70e amplify the received signals modulated by the amplitude modulators 60a to 60e, and output the amplified received signals to the detectors 80a to 80e respectively corresponding to the high frequency amplifiers 70a to 70e.

The transmission signal output from the distributor 30 and the received signals amplified by the high frequency amplifiers 70a to 70e are input to the detectors 80a to 80e. Then, in the detectors 80a to 80e mix the transmission signal output from the distributor 30 with the received signals output from the amplitude modulators 70a to 70e and generate beat signals. A high frequency component ($f_{tx}+f_{rx}$) is removed from the beat signals generated by the detectors 80a to 80e, and low frequency components ($f_{tx}-f_{rx}$) of the beat signals are output to the synthesizer 90 as detection signals. The $f_{tx}$ indicates the frequency of the transmission signal, and the $f_{rx}$ indicates the frequency of the received signal.

The synthesizer 90 synthesizes the detection signals detected by the detectors 80a to 80e. For example, the synthesizer 90 generates one synthetic signal by synthesizing a plurality of detection signals detected by the plurality of detectors 80a to 80e through a fast Fourier transform process as illustrated in FIG. 2(E). Then, the synthetic signal synthesized by the synthesizer 90 is output to the low frequency amplifier 100.

The low frequency amplifier 100 is a circuit for performing signal processing on the synthetic signal, and only one low frequency amplifier 100 is installed in the entire antenna device 1. The low frequency amplifier 100 amplifies the synthetic signal output from the synthesizer 90, and outputs the amplified synthetic signal to the A/D converter 110.

The A/D converter 110 is a circuit for performing signal processing on the synthetic signal, similarly to the low frequency amplifier 100, and only one A/D converter 110 is installed in the entire antenna device 1. Then, the A/D converter 110 converts the synthetic signal amplified by the low frequency amplifier 100 from an analog signal into a digital signal, and outputs the converted synthetic signal to the frequency band extraction filters 120a to 120e.

Figure 4:
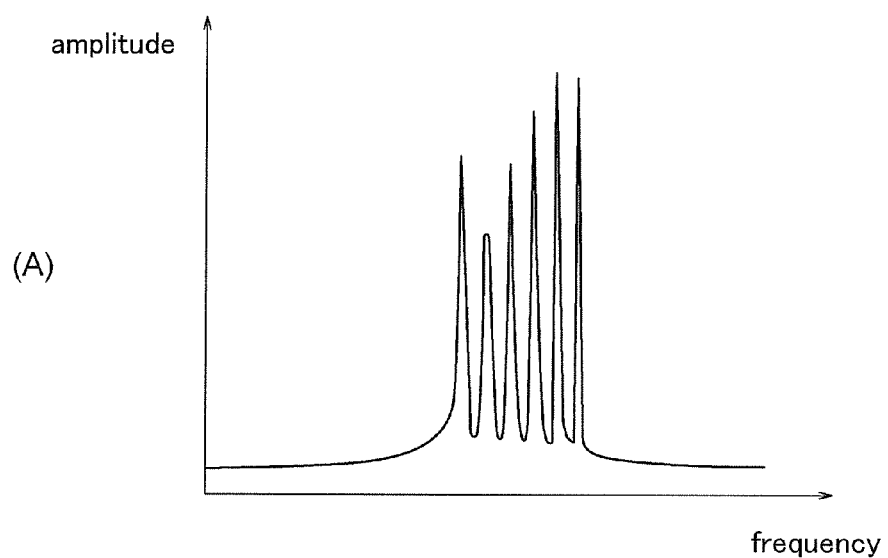
FIG. 4(A) is a diagram illustrating an example of a frequency component of a synthetic signal.
FIG. 4(B) is a diagram illustrating an example of a received signal detected by a control device.
Figure 4:
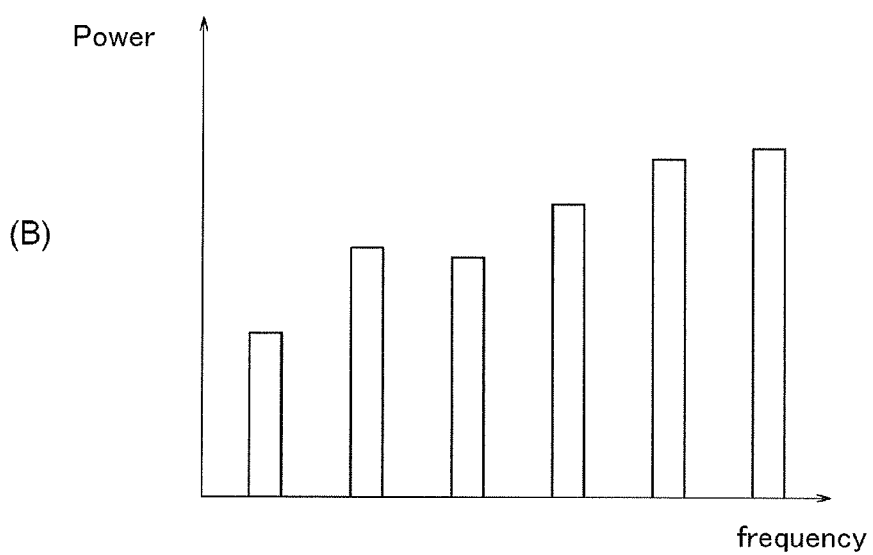

The frequency band extraction filters 120a to 120e are band pass filters. The frequency band extraction filters 120a to 120e respectively pass the received signal of the different frequency band. The received signals of the different frequency bands are extracted from the synthetic signal output from the A/D converter 110. Here, FIG. 4(A) is a diagram illustrating an example of the frequency component of the synthetic signal. As described above, since the synthetic signal is obtained by synthesizing the received signals of the different frequencies, the received signals that undergone the amplitude modulation process by the amplitude modulators 60a to 60e can be separated as different frequency components as illustrated in FIG. 4(A). Thus, for example, as the frequency band extraction filter 120a performs the filter process on the synthetic signal, the received signal of the frequency $f_0$ modulated by the amplitude modulator 60a can pass through the frequency band extraction filter 120a, and thus the received signal of the frequency $f_0$ modulated by the amplitude modulator 60a can be output from the synthetic signal. Further, as the frequency band extraction filter 120b performs the filter process on the synthetic signal, the received signal of the frequency $f_1$ modulated by the amplitude modulator 60b can pass through the frequency band extraction filter 120b, and thus the received signal of the frequency $f_1$ modulated by the amplitude modulator 60b can be output from the synthetic signal. Similarly, the other frequency band extraction filters 120c to 120e pass the received signals of the frequencies $f_2$ to $f_5$ modulated by the amplitude modulators 60c to 60e, and thus the received signals of the frequencies $f_2$ to $f_5$ modulated by the amplitude modulators 60c to 60e can be output from the synthetic signal. Then, the received signals extracted by the frequency band extraction filters 120a to 120e are output to the control device 130.

The control device 130 detects the power of the received signals output from the receiving antenna elements 50a to 50e on the basis of the received signals of the respective frequency bands extracted by the frequency band extraction filters 120a to 120e. In the present embodiment, the amplitude modulators 60a to 60e change the amplitudes of the received signals so that the integration value of the amplitudes of the received signals output from the receiving antenna elements 50a to 50e is equal to the integration value of the amplitudes of the received signals that have undergone the amplitude modulation process by the amplitude modulators 60a to 60e. Thus, the control device 130 can detect the received signals output from the receiving antenna elements 50a to 50e by integrating the amplitudes of the received signals of the respective frequency band extracted by the frequency band extraction filters 120a to 120e as illustrated in FIG. 4(B). Then, the control device 130 can perform various kinds of control such as a calculation of a distance D to the object on the basis of the detected received signals. FIG. 4(B) is a diagram illustrating an example of the received signal detected by the control device 130.

Figure 6:
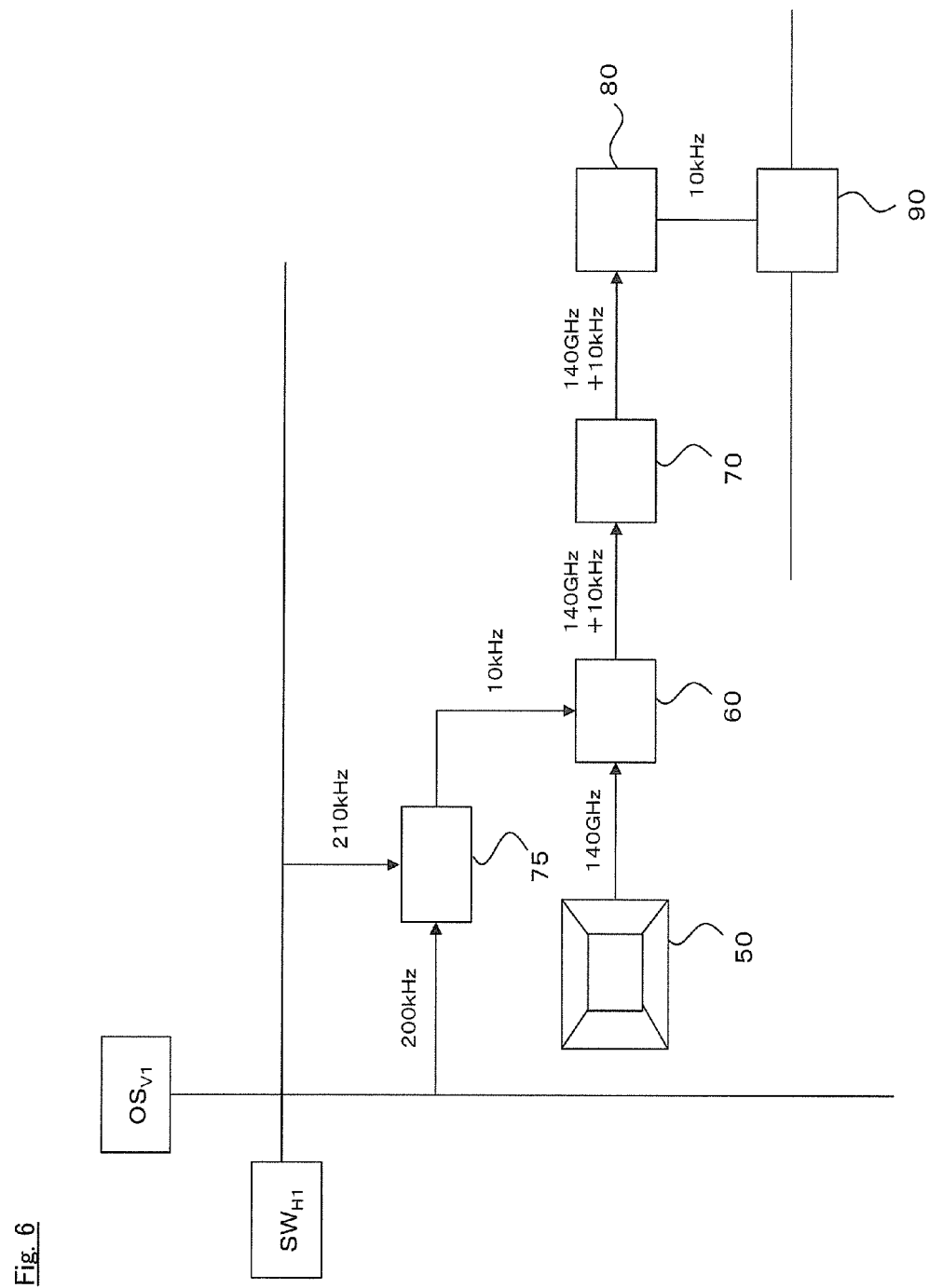
FIG. 6 is a diagram illustrating a configuration of a receiving antenna element circuit according to the first embodiment.

Next, a circuit configuration of the antenna device 1 according to the first embodiment will be described. FIG. 5 is a diagram illustrating a circuit configuration of the antenna device 1 according to the first embodiment. FIG. 6 is an enlarged diagram illustrating one enlarged receiving antenna element circuit in the circuit configuration illustrated in FIG. 5. In the above example, the antenna device 1 including the five receiving antenna elements 50a to 50e has been described, but the antenna device 1 including the array antenna 51 in which receiving antenna elements are arranged in an N×N matrix form will be described as an example.

As illustrated in FIG. 5, the antenna device 1 includes the array antenna 51 in which a plurality of receiving antenna element circuits $S_{H1V1}$ to $S_{HNVN}$ are two-dimensionally arranged (in FIG. 5, receiving antenna element circuits $S_{H1V1}$ to $S_{HNVN}$ configuring the array antenna 51 are indicated by H1V1 to HNVN).

The receiving antenna element circuits $S_{H1V1}$ to $S_{HNVN}$ according to the present embodiment includes any one of the first receiving antenna element that mainly receives the incident waves of the vertical polarized component and the second receiving antenna element that mainly receives the incident waves of the horizontal polarized component. Specifically, among the plurality of receiving antenna element circuits $S_{H1V1}$ to $S_{HNVN}$ that are two-dimensionally arranged, the receiving antenna element circuits $S_{H1V1}$ to $S_{H1VN}$, $S_{H3V1}$ to $S_{H3VN}$, . . . , and $S_{HN-1V1}$ to $S_{VH-1VN}$ arranged in the odd-numbered rows have the first receiving antenna element that mainly receives the incident waves of the horizontal polarized component, and the receiving antenna element circuits $S_{H2V1}$ to $S_{H2VN}$, $S_{H4V1}$ to $S_{H4VN}$, . . . , and $S_{HNV1}$ to $S_{HNVN}$ arranged in the even-numbered rows have the second receiving antenna element that mainly receives the incident waves of the vertical polarized component. Thus, the receiving antenna element circuits $S_{H1V1}$ to $S_{H1VN}$, $S_{H3V1}$ to $S_{H3VN}$, . . . , and $S_{HN-1V1}$ to $S_{HN-1VN}$ arranged in the odd-numbered rows can detect the horizontal polarized component transmitted from the object, and the receiving antenna element circuits $S_{H2V1}$ to $S_{H2VN}$, $S_{H4V1}$ to $S_{H4VN}$, . . . , and $S_{HNV1}$ to $S_{HNVN}$ arranged in the even-numbered rows can receive the vertical polarized component transmitted from the object. The arrangement of the receiving antenna element circuits $S_{H1V1}$ to $S_{HNVN}$ is not limited to the two-dimensional form and may be a honeycomb form, for example.

Further, the receiving antenna element circuits $S_{H1V1}$ to $S_{HNVN}$ are connected to switches $SW_{H1}$ to $SW_{HN}$ in units of rows as illustrated in FIG. 5. On/Off switching of the switches $SW_{H1}$ to $SW_{HN}$ is controlled by a row-classified switching control unit $C_H$. A row-classified signal for modulating the received signal is output from a row side oscillator $OS_H$ and a phase shifter PH to the receiving antenna element circuits $S_{H1V1}$ to $S_{HNVN}$.

Specifically, the row-classified switching control unit $C_H$ causes the row side oscillator $OS_H$ to output a row-classified signal $I_{f0}$ having a predetermined frequency $f_0$ (for example, 210 kHz) to the row-classified switching control unit $C_H$ and the phase shifter PH on the basis of an instruction of the control device 130. The phase shifter PH receives the row-classified signal $I_{f0}$ output from the row side oscillator $OS_H$, and changes the phase of the received row-classified signal $I_{f0}$. For example, in the present embodiment, the phase shifter PH changes the phase of the row-classified signal $I_{f0}$ of the frequency $f_0$ output from the row side oscillator $OS_H$ by 90°. Then, the phase shifter PH outputs a row-classified signal $I_{f0+90°}$ in which a frequency is $f_0$, and a phase is 90° to the row-classified switching control unit $C_H$.

Then, the row-classified switching control unit $C_H$ receives the row-classified signal $I_{f0}$ output directly from the row side oscillator $OS_H$ and the row-classified signal $I_{f0+90°}$ having the phase changed by the phase shifter PH. The row-classified switching control unit $C_H$ outputs the row-classified signal $I_{f0}$ output directly from the row side oscillator $OS_H$ and the row-classified signal $I_{f0+90°}$ having the phase changed by the phase shifter PH through different switches. Specifically, the row-classified switching control unit $C_H$ turns on the switches $SW_{H1}$ and $SW_{H2}$ and turns off the remaining switches $SW_{H3}$ to $SW_{HN}$ among the switches $SW_{H1}$ to $SW_{HN}$. Then, the row-classified switching control unit $C_H$ transmits the row-classified signal $I_{f0}$ to the receiving antenna element circuits $S_{H1V1}$ to $S_{H1VN}$ of the first row through the switch $SW_{H1}$, and transmits the row-classified signal $I_{f0+90°}$ to the receiving antenna element circuits $S_{H2V1}$ to $S_{H2VN}$ of the second row through the switch $SW_{H2}$. Further, the row-classified switching control unit $C_H$ extracts the received signals from the receiving antenna element circuits $S_{H1V1}$ to $S_{H1VN}$ and $S_{H2V1}$ to $S_{H2VN}$ of the first and second rows. Then, the row-classified switching control unit $C_H$ turns off the switches $SW_{H1}$ and $SW_{H2}$ and turns on the switches $SW_{H3}$ and $SW_{H4}$ on the basis of the instruction of the control device 130. Furthermore, the row-classified switching control unit $C_H$ transmits the row-classified signal $I_{f0}$ to the receiving antenna element circuits $S_{H3V1}$ to $S_{H3VN}$ of the third line through the switch $SW_{H3}$, and transmits the row-classified signal $I_{f0+90°}$ to the receiving antenna element circuits $S_{H4V1}$ to $S_{H4VN}$ of the fourth line through the switch $SW_{H4}$. Similarly, the row-classified switching control unit $C_H$ controls the remaining switches $SW_{H5}$ to $SW_{HN}$ on the basis of the instruction of the control device 130 such that the row-classified signals $I_{f0}$ and $I_{f0+90°}$ of the different phases are sequentially transmitted for every two lines.

Further, as described above, in the example illustrated in FIG. 5, the receiving antenna element circuits $S_{H1V1}$ to $S_{H1VN}$, $S_{H3V1}$ to $S_{H3VN}$, . . . , and $S_{HN-1V1}$ to $S_{VH-1VN}$ arranged in the odd-numbered rows have the first receiving antenna element that mainly receives the horizontal polarized component, and the receiving antenna element circuits $S_{H2V1}$ to $S_{H2VN}$, $S_{H4V1}$ to $S_{H4VN}$, . . . , and $S_{HNV1}$ to $S_{HNVN}$ arranged in the even-numbered rows have the second receiving antenna element that mainly receives the vertical polarized component. Thus, according to the control of the row-classified switching control unit $C_H$, the row-classified signal $I_{f0}$ of the phase 0° is transmitted to the receiving antenna element circuit having the first receiving antenna element that mainly receives the horizontal polarized component, and the row-classified signal $I_{f0+90°}$ of the phase 90° is transmitted to the receiving antenna element circuit having the second receiving antenna element that mainly receives the vertical polarized component. In other words, in the present embodiment, the row-classified signal having a phase according to a polarization direction of the incident waves received by the receiving antenna element is transmitted to the receiving antenna element circuits $S_{H1V1}$ to $S_{HNVN}$.

Further, as illustrated in FIG. 5, the receiving antenna element circuits $S_{H1V1}$ to $S_{HNVN}$ are connected to different column-classified oscillators $OS_{V1}$ to $OS_{VN}$ in units of columns, and receive column-classified signals of a plurality of different frequencies from the column-classified oscillators $OS_{V1}$ to $OS_{VN}$. Specifically, a column-classified modulation control unit $C_V$ is connected to the column-classified oscillators $OS_{V1}$ to $OS_{VN}$. The column-classified modulation control unit $C_V$ causes the column-classified oscillators $OS_{V1}$ to $OS_{VN}$ to output column-classified signals $I_{f1}$ to $I_{fN}$ of different predetermined frequencies $f_1$ to $f_N$ on the basis of the instruction of the control device 130. For example, in the example illustrated in FIG. 5, the column-classified modulation control unit $C_V$ causes the column-classified oscillator $OS_{V1}$ to output the column-classified signal $I_{f1}$ at 200 kHz, causes the column-classified oscillator $OS_{V2}$ to output the column-classified signal $I_{f2}$ at 230 kHz, and causes the column-classified oscillator $OS_{V3}$ to output the column-classified signal $I_{f3}$ at 240 kHz on the basis of the instruction of the control device 130. Similarly, the column-classified modulation control unit $C_V$ causes the column-classified oscillator $OS_{V4}$ to $OS_{VN}$ to output the column-classified signal $I_{f4}$ to $I_{fN}$ of the different frequencies $f_4$ to $f_N$ on the basis of the instruction of the control device 130. Further, the column-classified signals $I_{f1}$ to $I_{fN}$ output from the column-classified oscillators $OS_{V1}$ to $OS_{VN}$ have the same phase.

Next, a configuration of each of the receiving antenna element circuits $S_{H1V1}$ to $S_{HNVN}$ will be described. Each of the receiving antenna element circuits $S_{H1V1}$ to $S_{HNVN}$ includes a receiving antenna element 50, an amplitude modulator 60, a high frequency amplifier 70, a detector 80, and a difference frequency extractor 75 as illustrated in FIG. 6. The receiving antenna element 50 of each of the receiving antenna element circuits $S_{H1V1}$ to $S_{H1VN}$, $S_{H3V1}$ to $S_{H3VN}$, ..., and $S_{HN-1V1}$ to $S_{VH-1VN}$ arranged in the odd-numbered rows has the first receiving antenna element that mainly receives the horizontal polarized component as described above. The receiving antenna element 50 of each of the receiving antenna element circuits $S_{H2V1}$ to $S_{H2VN}$, $S_{H4V1}$ to $S_{H4VN}$, ..., and $S_{HNV1}$ to $S_{HNVN}$ arranged in the even-numbered rows has the second receiving antenna element that mainly receives the vertical polarized component.

The difference frequency extractor 75 receives either the row-classified signal $I_{f0}$ directly output from the row side oscillator $OS_H$ or the row-classified signal $I_{f0+90°}$ having the phase changed by the phase shifter PH and the column-classified signals $I_{f1}$ to $I_{fN}$ output from the column-classified oscillators $OS_{V1}$ to $OS_{VN}$. The difference frequency extractor 75 extracts a difference between a frequency of the row-classified signal $I_{f0}$ or $I_{f0+90°}$ and a frequency of the column-classified signals $I_{f1}$ to $I_{fN}$, and outputs a signal of a frequency corresponding to the difference as a modulation signal.

For example, the example illustrated in FIG. 6 illustrates a configuration of the receiving antenna element circuit $S_{H1V1}$ arranged in the first row and the first column among the receiving antenna element circuits $S_{H1V1}$ to $S_{HNVN}$ that are arranged in the two-dimensional form. In the example illustrated in FIG. 6, the difference frequency extractor 75 of the receiving antenna element circuit $S_{H1V1}$ receives the row-classified signal $I_{f0}$ at 210 kHz output directly from the row side oscillator $OS_H$ through the switch $SW_{H1}$ of the first row and the column-classified signal $I_{f1}$ at 200 kHz output from the column-classified oscillator $OS_{V1}$ of the first column. Then, the difference frequency extractor 75 extracts the frequency at 10 kHz as the difference between the frequency 210 kHz of the row-classified signal $I_{f0}$ and the frequency 200 kHz of the column-classified signal $I_{f1}$, and outputs a modulation signal $I_{f0-f1}$ having a frequency at 10 kHz. Then, the modulation signal $I_{f0-f1}$ at 10 kHz output from the difference frequency extractor 75 is transmitted to the amplitude modulator 60.

Although not illustrated, the row-classified signal $I_{f0}$ at 210 kHz output directly from the row side oscillator $OS_H$ through the switch $SW_{H1}$ of the first row and the column-classified signal $I_{f2}$ at 230 kHz output from the column-classified oscillator $OS_{V2}$ of the second column are input to the receiving antenna element circuit $S_{H1V2}$ arranged in the first row and the second column. In this case, the difference frequency extractor 75 of the receiving antenna element circuit $S_{H1V2}$ extracts a frequency at 20 kHz as the difference between the frequency 210 kHz of the row-classified signal $I_{f0}$ and the frequency 230 kHz of the column-classified signal $I_{f2}$, and outputs a modulation signal $I_{f0-f2}$ at the frequency 20 kHz. Then, the modulation signal $I_{f0-f2}$ at 20 kHz output from the difference frequency extractor 75 is transmitted to the amplitude modulator 60.

Further, although not illustrated, the row-classified signal $I_{f0+90°}$ at the frequency 210 kHz and the phase 90° output from the phase shifter PH through the switch $SW_{H2}$ of the second row and the column-classified signal $I_{f1}$ at 200 kHz output from the column-classified oscillator $OS_{V1}$ of the first column are input to the receiving antenna element circuit $S_{H2V1}$ arranged in the second row and the first column. In this case, the difference frequency extractor 75 of the receiving antenna element circuit $S_{H2V1}$ extracts the frequency at 10 kHz as the difference between the frequency 210 kHz of the row-classified signal $I_{f0+90°}$ and the frequency 200 kHz of the column-classified signal $I_{f1}$, and outputs the modulation signal $I_{f0-f1+90°}$ of the frequency 10 kHz and the phase 90°. Then, the modulation signal $I_{f0-f1+90°}$ at 10 kHz and 90° output from the difference frequency extractor 75 is transmitted to the amplitude modulator 60.

Then, the amplitude modulator 60 receives the received signal output from the receiving antenna element 50 and the modulation signal output from the difference frequency extractor 75, and modulates the received signal output from the receiving antenna element 50 using the received modulation signal. For example, in the example illustrated in FIG. 6, the amplitude modulator 60 receives the received signal at 140 GHz output from the receiving antenna element 50 of the receiving antenna element circuit $S_{H1V1}$, and receives the modulation signal $I_{f0-f1}$ at 10 kHz from the difference frequency extractor 75. In this case, the amplitude modulator 60 modulates the amplitude of the received signal at 140 GHz received from the receiving antenna element 50 with a period corresponding to 10 kHz by using the modulation signal $I_{f0-f1}$ at 10 kHz received from the difference frequency extractor 75. Then, the received signal that has undergone the amplitude modulation by the amplitude modulator 60 is amplified by the high frequency amplifier 70 and then transmitted to the detector 80.

The detector 80 outputs the detection signal on the basis of the received signal modulated by the amplitude modulator 60. Specifically, the detector 80 outputs the signal that has a power (amplitude) according to the power (amplitude) of the received signal received by the receiving antenna element 50 and has the same frequency and phase as the modulation signal extracted by the difference frequency extractor 75.

For example, the detector 80 of the receiving antenna element circuit $S_{H1V1}$ illustrated in FIG. 6 outputs the detection signal that has the power according to the power of the received signal received by the receiving antenna element 50 and has the same frequency 10 kHz and the same phase 0° as the modulation signal $I_{f0-f1}$. Further, for example, the detector 80 of the receiving antenna element circuit $S_{H1V2}$ outputs the detection signal that has a power according to the power of the received signal and has the same frequency 20 kHz and the same phase 0° as the modulation signal $I_{f0-f2}$. Furthermore, the detector 80 of the receiving antenna element circuit $S_{H2V1}$ output the detection signal that has a power according to the power of the received signal and has the same frequency 10 kHz and the same phase 90° as the modulation signal $I_{f0-f1+90°}$.

Further, when there is an object (for example, an obstacle, a rail, a curbstone, or the like) within a receiving area in which the array antenna 51 can receive the incident waves, the power (amplitude) of the received signal of the receiving antenna element 50 that receives the incident waves from the object increases. Conversely, the power (amplitude) of the receiving antenna element 50 of the received signal that receives the incident waves from a region (for example, the sky, a distant background, or the like) that does not correspond to an object decreases. Thus, the power (amplitude) of the detection signal of the receiving antenna element circuit S corresponding to an object increases, and the power (amplitude) of the detection signal of the receiving antenna element circuit S that does not correspond to a detection object decreases.

Then, the detection signal output from the detector 80 of each of the receiving antenna element circuits $S_{H1V1}$ to $S_{HNVN}$ is transmitted to the synthesizer 90. The synthesizer 90 is installed for every two rows of the receiving antenna element circuits $S_{H1V1}$ to $S_{HNVN}$ that are arranged in the two-dimensional form. The synthesizer 90 receives the detection signals output from the receiving antenna element circuits of the two rows, and generates one synthetic signal by synthesizing the detection signals, for example, through the fast Fourier transform or the like.

For example, in the example illustrated in FIG. 5, when the switches $SW_{H1}$ and $SW_{H2}$ are set to the ON state, the synthesizer $90_1$ corresponding to the first and second rows synthesizes a plurality of detection signals output from the receiving antenna element circuits $S_{H1V1}$ to $S_{H1VN}$ of the first row connected to the switch $SW_{H1}$ and a plurality of detection signals output from the receiving antenna element circuit $S_{H2V1}$ to $S_{H2VN}$ of the second row connected to the switch $SW_{H2}$, and outputs one synthetic signal. Further, when the switches $SW_{H3}$ and $SW_{H4}$ are set to the ON state, the synthesizer $90_2$ corresponding to the third and fourth rows synthesizes a plurality of detection signals output from the receiving antenna element circuits $S_{H3V1}$ to $S_{H3VN}$ connected to the switch $SW_{H3}$ and a plurality of detection signals output from the receiving antenna element circuits $S_{H4V1}$ to $S_{H4VN}$ connected to the switch $SW_{H4}$, and outputs one synthetic signal. Similarly, for the other rows, the synthesizer 90 synthesizes a plurality of detection signals output from the receiving antenna element circuits of the two rows, and generates one synthetic signal.

Further, in the example illustrated in FIG. 5, the receiving antenna element circuits $S_{H1V1}$ to $S_{HNVN}$ are connected to the column-classified oscillators $OS_{V1}$ to $OS_{VN}$ that output the column-classified signals having the different frequencies in units of columns. Thus, in the receiving antenna element circuits $S_{H1V1}$ to $S_{HNVN}$, the frequency of the modulation signal output from the difference frequency extractor 75 differs according to a column, and the frequency of the detection signal output from the detector 80 differs according to a column as well. For example, in the example illustrated in FIG. 5, the detection signal at 10 kHz is output from the receiving antenna element circuit $S_{H1V1}$, the detection signal at 20 kHz is output from the receiving antenna element circuit $S_{H1V2}$, and the detection signal at 30 kHz is output from the receiving antenna element circuit $S_{H1V3}$. Further, in the present embodiment, the row-classified signal of the phase 0° is input from the row-classified oscillator $OS_H$ to the receiving antenna element circuits $S_{H1V1}$ to $S_{H1VN}$, $S_{H3V1}$ to $S_{H3VN}$, . . . , and $S_{HN-1V1}$ to $S_{HN-1VN}$ of the odd-numbered rows that mainly receive the incident waves of the horizontal polarized component, whereas the row-classified signal of the phase 90° is input from the phase shifter PH to the receiving antenna element circuits $S_{H1V1}$ to $S_{H1VN}$, $S_{H3V1}$ to $S_{H3VN}$, . . . , and $S_{HN-1V1}$ to $S_{HN-1VN}$ of the even-numbered rows that mainly receive the incident waves of the vertical polarized component. In the present embodiment, the detection signals are synthesized to generate the synthetic signal for every two rows. The row-classified signal input to the receiving antenna element circuit of the first row of the two rows and the row-classified signal input to the receiving antenna element circuit of the second row differ in the phase. As described above, since the detection signals output from the receiving antenna element circuits of the two rows differ in the phase and the frequency, the synthesizer 90 can synthesize the detection signals received from the receiving antenna element circuits of the two rows so that the detection signals can be separated.

Then, the synthetic signal synthesized by the synthesizer 90 is transmitted to the low frequency amplifier 100 and undergoes low frequency component amplification by the low frequency amplifier 100. Thereafter the synthetic signal is converted into a digital signal through the A/D converter 110. Then, the synthetic signal that has undergone the signal processing is transmitted to each frequency band extraction filter 120, and each received signal is extracted from the synthetic signal for each phase and each frequency.

Figure 7:
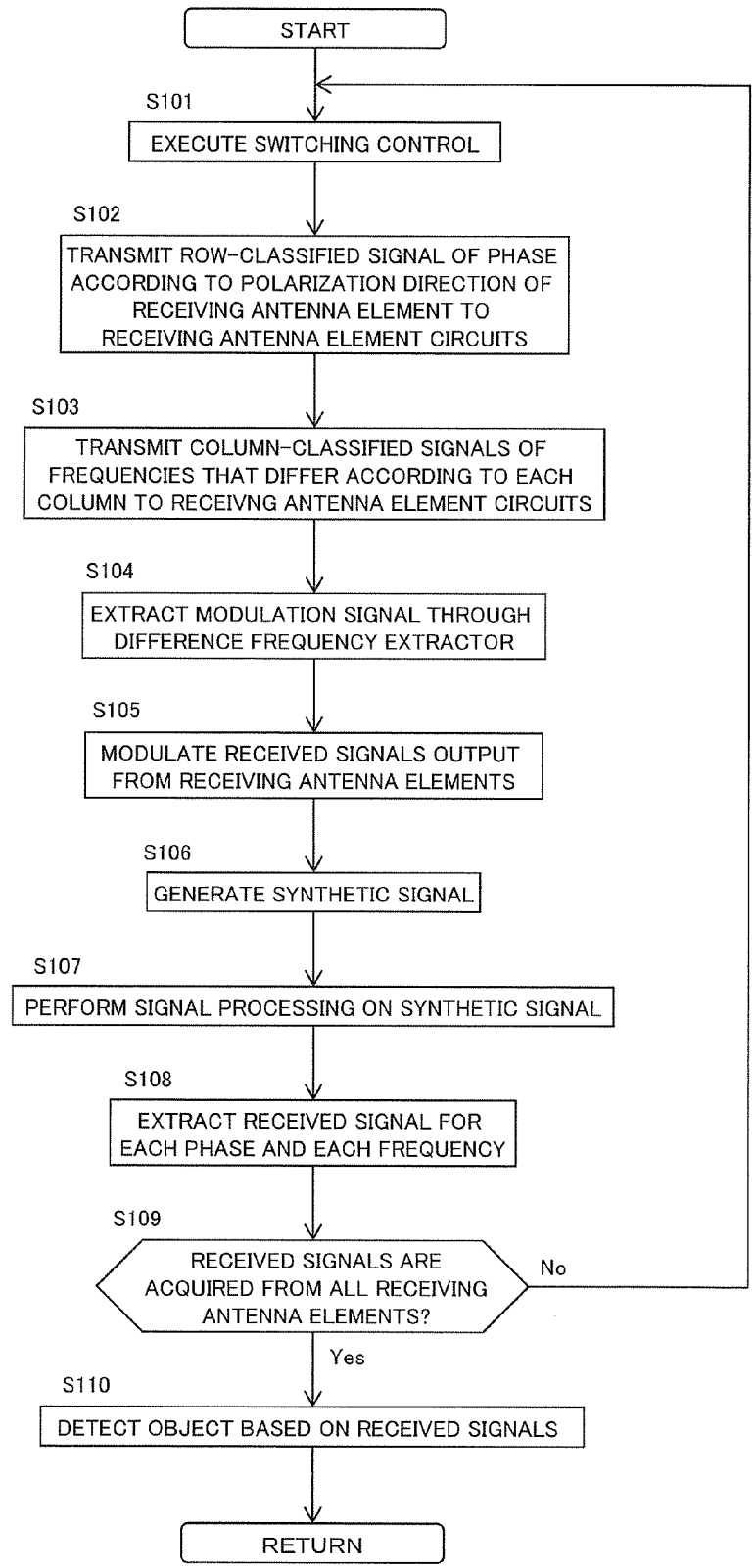
FIG. 7 is a flowchart illustrating an operation of an antenna device according to the first embodiment.

Next, an operation of the antenna device 1 according to the first embodiment will be described with reference to FIG. 7. FIG. 7 is a flowchart illustrating an operation of the antenna device 1 according to the first embodiment. The operation of the antenna device 1 illustrated in FIG. 7 is repeatedly performed at predetermined intervals.

First, in step S101, switching control for the switches $SW_{H1}$ to $SW_{HN}$ is performed through the row-classified switching control unit $C_H$. In the present embodiment, first, the control device 130 transmits a switching instruction for the switches $SW_{H1}$ to $SW_{HN}$ to the row-classified switching control unit $C_H$. Thus, the row-classified switching control unit $C_H$ sets the switches of the two rows to the ON state, and sets the remaining switches to the OFF state. For example, immediately after the process illustrated in FIG. 7 starts, the row-classified switching control unit $C_H$ sets the switches $SW_{H1}$ and $SW_{H2}$ to the ON state, and sets the remaining switch $SW_{H3}$ to $SW_{HN}$ to the OFF state. Thereafter, in step S109 which will be described later, it is determined that any one of the received signals of the receiving antenna element circuits have not been extracted and thus the process returns to step S101. In this case, for example, the switches $SW_{H1}$ and $SW_{H2}$ that are current in the ON state are changed to the OFF state, and the switches $SW_{H3}$ and $SW_{H4}$ of the next two rows are set to the ON state.

In step S102, the row-classified switching control unit $C_H$ outputs the row-classified signal having the phase according to the polarization direction of the incident waves received by the receiving antenna element 50 to each of the receiving antenna element circuits $S_{H1V1}$ to $S_{HNVN}$ through the switch SW set to the ON state in step S101. For example, in the present embodiment, the row-classified switching control unit $C_H$ causes the row side oscillator $OS_H$ to generate the row-classified signal $I_{f0}$ of the phase 0° and the frequency 210 kHz on the basis of the instruction of the control device 130. Then, the row-classified switching control unit $C_H$ causes the generated row-classified signal $I_{f0}$ to be transmitted to the receiving antenna element circuits $S_{H1V1}$ to $S_{H1VN}$ of the first row that mainly receive the horizontal polarized component through the switch $SW_{H1}$ set to the ON state in step S101. Further, the row-classified switching control unit $C_H$ transmits the row-classified signal generated by the row side oscillator $OS_H$ to the phase shifter PH, and causes the phase shifter PH to change the phase of the row-classified signal to 90°. Then, the row-classified switching control unit $C_H$ transmits the row-classified signal $I_{f0+90°}$ of the phase 90° and the frequency 210 kHz to the receiving antenna element circuit $S_{H2V1}$ to $S_{H2VN}$ of the second row that mainly receive the vertical polarized component through the switch $SW_{H2}$ set to the ON state in step S101.

In step S103, the column-classified signals having the different frequencies are respectively output to the receiving antenna element circuits $S_{H1V1}$ to $S_{HNVN}$ in units of columns. In other words, on the basis of the instruction of the control device 130, the column-classified modulation control unit $C_V$ causes the column-classified oscillators $OS_{V1}$ to $OS_{VN}$ to generate the column-classified signals having the different frequencies and transmit the column-classified signals having the different frequencies to the receiving antenna element circuits $S_{H1V1}$ to $S_{HNVN}$ in units of columns. For example, the column-classified modulation control unit $C_V$ causes the column-classified signal at 200 kHz to be transmitted from the column-classified oscillator $OS_{V1}$ of the first column to the receiving antenna element circuits $S_{H1V1}$, $S_{H2V1}$, $S_{H3V1}$, . . . , and $S_{HNV1}$ of the first column, and causes the column-classified signal at 230 kHz to be transmitted from the column-classified oscillator $OS_{V2}$ of the second column to the receiving antenna element circuits $S_{H1V2}$, $S_{H2V2}$, $S_{H3V2}$, . . . , and $S_{HNV2}$ of the second column. Similarly, regarding to the receiving antenna element circuit $S_{H1V3}$ to $S_{HNV3}$ of the third column to the receiving antenna element circuits $S_{H1VN}$ to $S_{HNVN}$ of an N-th column, the column-classified modulation control unit $C_V$ causes the column-classified signals having the different frequencies to be transmitted in units of columns.

Then, a process of steps S104 and S105 is performed in each receiving antenna element circuit connected to the switch set to the ON state in step S101. First, in step S104, the difference frequency extractor 75 of the receiving antenna element circuit extracts the modulation signal of the frequency corresponding to the difference between the frequency of the row-classified signal $I_{f0}$ or $I_{f0+90°}$ transmitted in step S102 and the frequency of the column-classified signals $I_{f1}$ to $I_{fN}$ transmitted in step S103.

For example, in the example illustrated in FIG. 6, the receiving antenna element circuit $S_{H1V1}$ of the first row and the first column receives the row-classified signal $I_{f0}$ of the frequency 210 kHz and the phase 0° output from the row side oscillator $OS_H$ through the switch $SW_{H1}$ of the first row and the column-classified signal $I_{f1}$ of the frequency 200 kHz output from the column-classified oscillator $OS_{V1}$ of the first column. Thus, the difference frequency extractor 75 of the receiving antenna element circuit $S_{H1V1}$ outputs the modulation signal $I_{f0-f1}$ of the frequency (that is, 10 kHz) corresponding to the difference between the frequency 210 kHz of the row-classified signal $I_{f0}$ and the frequency 200 kHz of the column-classified signal $I_{f1}$.

Further, in step S105, the amplitude modulator 60 of the receiving antenna element circuit performs the amplitude modulation on the received signal output from each receiving antenna element 50 using the modulation signal output in step S104. The received signal that has undergone the amplitude modulation undergoes high frequency component amplification by the high frequency amplifier 70, and is then input to the detector 80 and output as the detection signal. Specifically, the detector 80 outputs the detection signal that has the same frequency and the same phase as the modulation signal used for the amplitude modulation and has the power according to the power of the received signal.

Then, in step S106, the synthesizer 90 synthesizes a plurality of detection signals output in step S105. In the present embodiment, the synthesizer 90 is installed for every two rows of the receiving antenna element circuits $S_{H1V1}$ to $S_{HNVN}$ that are arranged in the two dimensional form. The synthesizer 90 receives the detection signals having the frequency and the phase according to the row and column positions of the receiving antenna element circuits from the receiving antenna element circuits $S_{HiV1}$ to $S_{HiVN}$ and $S_{Hi+1V1}$ to $S_{Hi+1VN}$ (i=1 to N-1) of the two rows. The synthesizer 90 synthesizes the received detection signals and outputs one synthetic signal.

In step S107, predetermined signal processing is performed on the synthetic signal generated in step S106. In the present embodiment, low frequency amplification by the low frequency amplifier 100 and conversion from the analog signal to the digital signal by the A/D converter 110 are performed as the signal processing for the synthetic signal. Then, in step S108, the frequency band extraction filter 120 performs the filter process on the synthetic signal that has undergone the predetermined signal processing in step S107 according to the frequency and the phase of the modulated received signal. Thus, the frequency band extraction filter 120 extracts the received signal from the synthetic signal for each frequency and each phase.

Then, in step S109, the control device 130 determines whether or not the received signals output from all the receiving antenna element circuits $S_{H1V1}$ to $S_{HNVN}$ configuring the array antenna 51 have been acquired. When all the received signals are determined to have been acquired in step S109, the process proceeds to step S110, and in step S110, the control device 130 detects the object using the acquired received signals. A known method may be used as a method of detecting the object. On the other hand, when any one of the received signals is determined to have not been acquired in step S109, the process returns to step S101, and the process of steps S101 to S108 is performed on the receiving antenna element circuits $S_{H1VN}$ to $S_{HNVN}$ in which the received signal has not been acquired.

In other words, when any one of the received signals is determined to have not been acquired in step S109, for example, if the switches $SW_{H1}$ and $SW_{H2}$ of the first and second rows stay set to the ON state, the control device 130 causes the row-classified switching control unit $C_H$ to change the switches $SW_{H1}$ and $SW_{H2}$ of the first and second rows to the OFF state and set the switches $SW_{H3}$ and $SW_{H4}$ of the third and fourth rows to the ON state (step S101). Then, the row-classified switching control unit $C_H$ transmits the row-classified signal $I_{f0}$ or $I_{f0+90°}$ of the phase according to the polarization direction of the incident waves received by the receiving antenna element circuit $S_{H3V1}$ to $S_{H4VN}$ of the third and fourth rows to the receiving antenna element circuit $S_{H3V1}$ to $S_{H4VN}$ of the third and fourth rows through the switches $SW_{H3}$ and $SW_{H4}$ of the third and fourth rows (step S102). Then the column-classified modulation control unit $C_V$ transmits the column-classified signals $I_{f1}$ to $I_{fn}$ having the different frequencies according to the column to the receiving antenna element circuit $S_{H3V1}$ to $S_{H4VN}$ of the third and fourth rows (step S103). Further, the received signals output from the receiving antenna elements 50 of the receiving antenna element circuit $S_{H3V1}$ to $S_{H4VN}$ of the third and fourth rows are modulated into the signals having the frequencies according to the differences between the row-classified signal $I_{f0}$ or $I_{f0+90°}$ and the column-classified signals $I_{f1}$ to $I_{fn}$ (step S105). A plurality of modulated received signals are synthesized to generate one synthetic signal (step S106). Then, predetermined signal processing is performed on the synthetic signal (step S107). The received signals are extracted for each phase and each frequency, and a plurality of received signals output from the receiving antenna element circuit $S_{H3V1}$ to $S_{H4VN}$ of the third and fourth rows are acquired (step S108).

Then, after the process of steps S102 to S108 is performed on the receiving antenna element circuit $S_{H3V1}$ to $S_{H4VN}$ of the third and fourth rows, the switches $SW_{H5}$ and $SW_{H6}$ of the fifth and sixth rows are similarly set to the ON state, and the process of steps S102 to S108 is performed on the receiving antenna element circuit $S_{H5V1}$ to $S_{H6VN}$ of the fifth and sixth rows. As described above, the process of steps S102 to S108 is performed on the receiving antenna element circuits for every two rows until the process of steps S102 to S108 is performed on the receiving antenna element circuit $S_{HNV1}$ to $S_{HNVN}$ of the N-th row. Then, after the process of steps S102 to S108 is performed on the receiving antenna element circuit $S_{HNV1}$ to $S_{HNVN}$ of the N-th row, the process proceeds to step S110. In step S110, various kinds of control such as the object detection is performed on the basis of all the received signals output from the array antenna 51. Then, the process returns to step S101, and the process of steps S101 to S110 is repeated.

As described above, in the first embodiment, the received signals received by the receiving antenna elements 50a to 50e are modulated into the received signals of a plurality of different frequencies and a phase according to the polarization direction of the incident waves received by the receiving antenna element 50 through the amplitude modulators 60a to 60e, and the modulated frequencies are synthesized to generate one synthetic signal. Further, the low frequency amplification process or the A/D conversion process undergoes on the generated synthetic signal. It is possible to commonalize the low frequency amplifier 100 or the A/D converter 110. Thus, since it is unnecessary to install the analog circuit needing a relatively large space such as the low frequency amplifier 100 or the A/D converter 110 for each of the receiving antenna elements 50a to 50e, it is possible to implement the space saving of the entire antenna device 1.

Particularly, in the present embodiment, as the received signal output from the receiving antenna element 50 is modulated to have a phase according to the polarization direction of the incident waves received by the receiving antenna element 50, it is possible to process the received signal output from the first receiving antenna element that mainly receives the incident waves of the vertical polarized component and the received signal output from the second receiving antenna element that mainly receives the incident waves of the horizontal polarized component at the same time. It is possible to compare the power of the horizontal polarized component and the vertical polarized component simultaneously output from the object. As the result, it is possible to detect the feature of the object and thus detect the object with a high degree of accuracy.

Further, in the present embodiment, the frequency bands modulated by the amplitude modulators 60a to 60e are decided as the modulation frequency band in advance, and the amplitude modulators 60a to 60e performs the modulation process on the received signal so that the frequency of the received signal is equal to the frequency within the modulation frequency band. As the frequency band at which the received signal is modulated as described above is decided in advance, it is possible to appropriately extract the received signals modulated by the amplitude modulators 60a to 60e through the frequency band extraction filters 120c to 120e. Further, in the present embodiment, the upper limit value of the modulation frequency band is set as the upper limit value of the frequency at which no waveform distortion occurs in the detectors 80a to 80e or the frequency (for example, 1 GHz or 1 MHz) that is 1/10 of the sampling frequency of the A/D converter 110. The lower limit value of the modulation frequency band is set as the frequency corresponding to a receiving cycle of the received signal or a modulating cycle of the amplitude value by the amplitude modulators 60a to 60e. Thus it is possible to appropriately perform signal processing on the modulated received signal.

Further, in the present embodiment, the band pass filter that passes a received signal of a predetermined frequency band is used as the frequency band extraction filters 120a to 120e, and thus it is possible to reduce a processing load such as a calculation load in the signal processing for the received signal. Further, in the present embodiment, the transmission antenna element 40 is provided, and it is possible to detect the object by transmitting the transmission waves from the transmission antenna element 40 and receiving the incident waves arrived as the transmission waves is reflected by the object.

Figure 8:
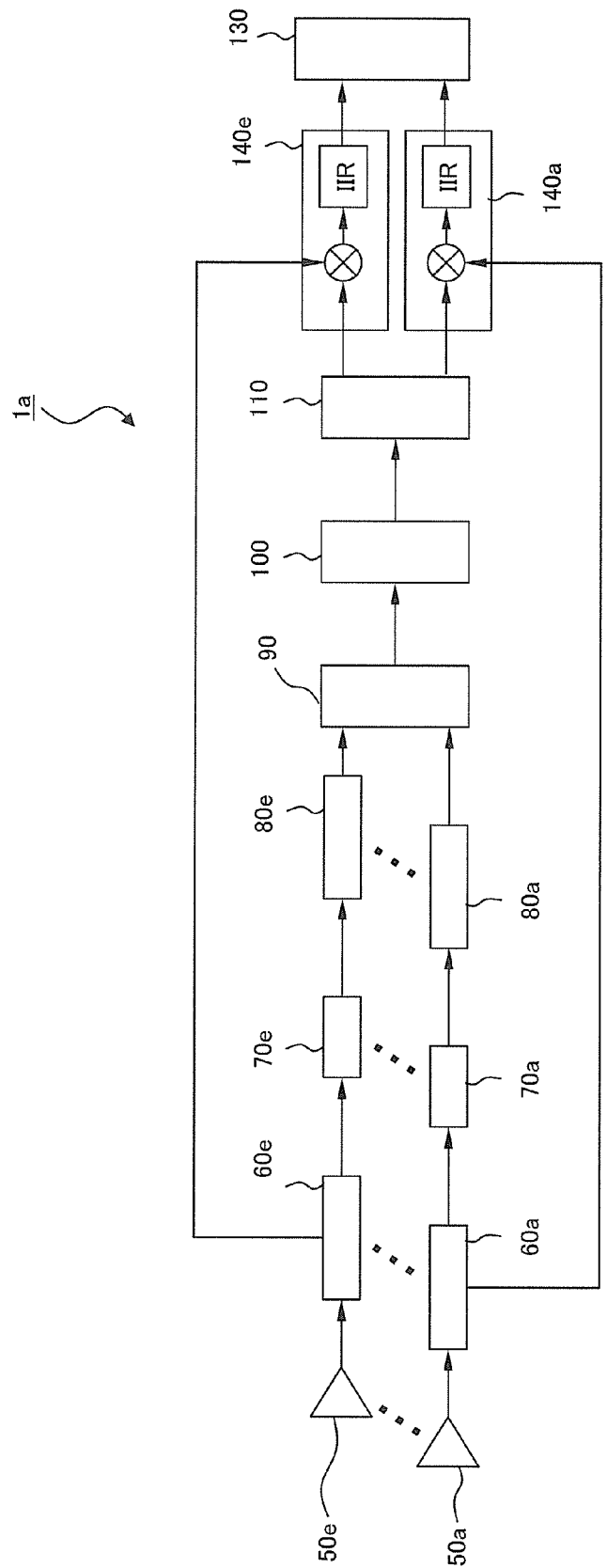
FIG. 8 is a block diagram illustrating a configuration of an antenna device according to a second embodiment.

Next, a second embodiment of the present invention will be described. FIG. 8 is a schematic diagram illustrating a configuration of an antenna device 1a according to the second embodiment. The second embodiment has a similar configuration as the first embodiment except that synchronous detectors 140a to 140e are provided instead of the frequency band extraction filters 120a to 120e of the antenna device 1 illustrated in FIG. 1. The antenna device 1a according to the second embodiment will be described below with reference to FIG. 8. The receiving antenna elements 50b to 50d, the amplitude modulators 60b to 60d, the high frequency amplifiers 70b to 70d, the detectors 80b to 80d, and the synchronous detectors 140b to 140d are not illustrated in FIG. 8.

The synchronous detectors 140a to 140e extract the received signals of the respective frequency bands from the synthetic signal output from the A/D converter 110, similarly to the frequency band extraction filters 120a to 120e according to the first embodiment. Specifically, each of the synchronous detectors 140a to 140e is configured with a multiplier and an IIR filter. The synchronous detectors 140a to 140e perform phase synchronization on the synthetic signal output from the A/D converter 110 by using the received signals modulated by the amplitude modulators 60a to 60e respectively corresponding to the synchronous detectors 140a to 140e. Then, the phase synchronized signals are passed through the IIR filter. Thus the synchronous detectors 140a to 140e can extract the received signals modulated by the amplitude modulators 60a to 60e from the synthetic signal.

As described above, in the second embodiment, it is possible to extract the received signals modulated by the amplitude modulators 60a to 60e from the synthetic signal by performing phase synchronization on the synthetic signal synthesized by the synthesizer 90 by using the received signals modulated by the amplitude modulators 60a to 60e through the synchronous detectors 140a to 140e. Thus, in the second embodiment, since it is unnecessary to install the analog circuit needing a relatively large space such as the low frequency amplifier 100 or the A/D converter 110 for each of the receiving antenna elements 50 a to 50e, it is possible to implement the space saving of the entire antenna device 1. Further, in the second embodiment, as the phase synchronization is performed, it is possible to extract the received signals by using a relatively small amount of data, and thus it is possible to reduce the receiving period of the received signal.

Figure 9:
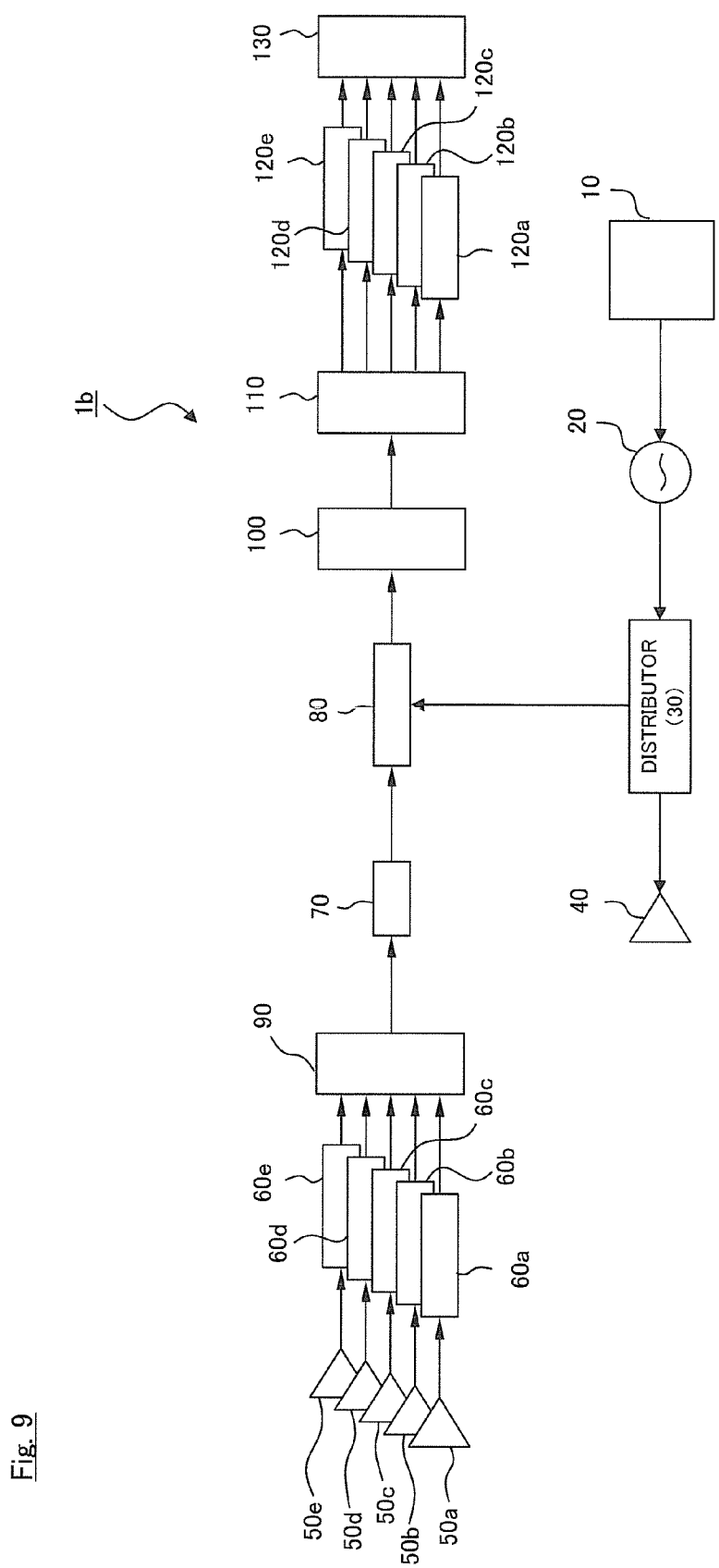
FIG. 9 is a block diagram illustrating a configuration of an antenna device according to a third embodiment.

Next, a third embodiment of the present invention will be described. FIG. 9 is a scheme diagram illustrating an antenna device 1b according to the third embodiment. The antenna device 1b according to the third embodiment has a similar configuration as the antenna device 1 according to the first embodiment except that the synthesizer 90 is arranged directly behind the amplitude modulators 60a to 60e, and one high frequency amplifier 70, one detector 80, one low frequency amplifier 100, and one A/D converter 110 are arranged. Further, in the antenna device 1b according to the third embodiment, a plurality of received signals modulated by the amplitude modulators 60a to 60e are input to the synthesizer 90, and the synthesizer 90 generates one synthetic signal. Furthermore, one synthetic signal is sequentially processed through one high frequency amplifier 70, one detector 80, one low frequency amplifier 100, and one A/D converter 110.

Specifically, in the third embodiment, the synthesizer 90 synthesizes the received signals modulated to have the different frequencies by the amplitude modulators 60a to 60e, and generates the synthetic signal. The synthetic signal synthesized by the synthesizer 90 is amplified by the high frequency amplifier 70, and thereafter, the detector 80 detects the detection signal of the low frequency component. Then, the detection signal detected by the detector 80 is amplified by the low frequency amplifier 100 and then converted into the digital signal through the A/D converter 110. Then, the detection signal converted into the digital signal is bifurcated and output to the frequency band extraction filters 120a to 120e.

The frequency band extraction filters 120a to 120e extract the received signals of the respective frequency bands from the synthetic signal output from the A/D converter 110, similarly to the first embodiment. Specifically, the frequency band extraction filters 120a to 120e pass the received signals of the frequencies $f_0$ to $f_5$ modulated by the amplitude modulators 60a to 60e, and output the received signals of the frequencies $f_0$ to $f_5$ modulated by the amplitude modulators 60a to 60e from the synthetic signal. Then, the received signals extracted by the frequency band extraction filters 120a to 120e are input to the control device 130, and the power of the received signals are detected and thereafter used for various kinds of control such as a measurement of the distance to the object.

As described above, in the third embodiment, as the synthesizer 90 is arranged directly behind the amplitude modulators 60a to 60e, the high frequency amplifier 70, the detector 80, the low frequency amplifier 100, and the A/D converter 110 can be commonalized, and thus it is possible to further increase the space saving of the antenna device 1b in addition to the first embodiment.

Further, in the third embodiment, the received signals modulated by the amplitude modulators 60a to 60e are synthesized by the synthesizer 90, and then the synthetic signal is input to the high frequency amplifier 70, and thus it is possible to increase an amount of the signal input to the high frequency amplifier 70, it is consequently possible to effectively prevent amplification of noise, and it is possible to perform the signal processing stably.

Figure 10:
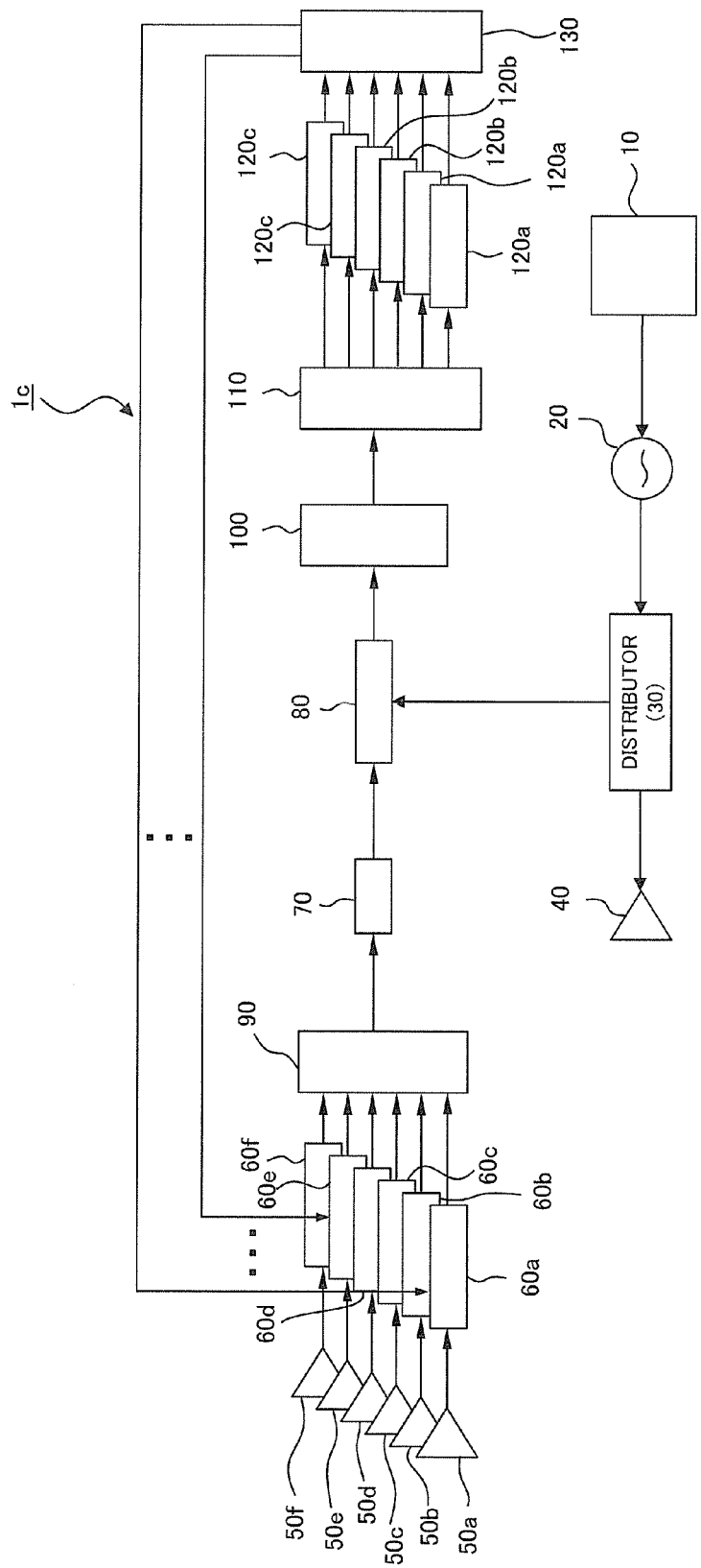
FIG. 10 is a block diagram illustrating a configuration of an antenna device according to a fourth embodiment.

Next, a fourth embodiment of the present invention will be described. FIG. 10 is a block diagram illustrating a configuration of an antenna device 1c according to the fourth embodiment. The antenna device 1c according to the fourth embodiment has a similar configuration as the antenna device 1b according to the third embodiment except points described below, and operates similarly to the antenna device 1b according to the third embodiment. The antenna device 1c according to the fourth embodiment will be described below with reference to FIG. 10.

The control device 130 according to the fourth embodiment has a function for determining influence of a noise on the received signal on the basis of an error (or a variation) in output values of the received signals extracted by the frequency band extraction filters 120a to 120e. The control device 130 controls the amplitude modulators 60a to 60f such that the influence of the noise is suppressed when the influence of the noise is determined to be high.

For example, in the present embodiment, the control device 130 repeatedly detects the power of the received signals extracted from the frequency band extraction filters 120a to 120e at predetermined intervals (for example, in units of several tens of milliseconds), and repeatedly determines whether or not the variance of the power of the received signals consecutively obtained within a predetermined period of time is a predetermined value (for example, 3σ) or more. Then, when the variance of the power of the received signals is a predetermined value (for example, 3σ) or more, the control device 130 determines that the noise has influence on the received signal, and modulates the received signal to have the same frequency for every two amplitude modulators among the amplitude modulators 60a to 60f in order to suppress the influence of the noise. In other words, as the received signals obtained by two pixels (receiving antenna elements) are synthesized, a signal amount of the received signals is increased, and thus the influence of the noise is suppressed.

Specifically, when the influence of the noise on the received signal is determined to be low, the control device 130 causes the amplitude modulators 60a to 60f to modulate the received signals to have the frequencies corresponding to the different frequencies $f_0$ to $f_5$. On the other hand, when the influence of the noise on the received signal is determined to be high, the control device 130 causes the amplitude modulator 60a and the amplitude modulator 60b to modulate the received signals to have the frequency corresponding to the frequency $f_0$, causes the amplitude modulator 60c and the amplitude modulator 60d to modulate the received signals to have the frequency corresponding to the frequency $f_1$, and causes the amplitude modulator 60e and the amplitude modulator 60f to modulate the received signals to have the frequency corresponding to the frequency $f_2$.

As described above, in the fourth embodiment, it is determined whether or not the influence of the noise is high on the basis of the error (or the variation) in the output value of the received signal. When the influence of the noise on the received signal is determined to be high, the received signals that are modulated by the amplitude modulators 60a to 60f are modulated to have the same frequency two by two. Thus, it is possible to synthesize the received signals obtained by the two pixels (receiving antenna elements) into one received signal, and as a result, it is possible to increase the signal amount of the received signal, and thus it is possible to suppress the influence of the noise on the received signal.

Figure 11:
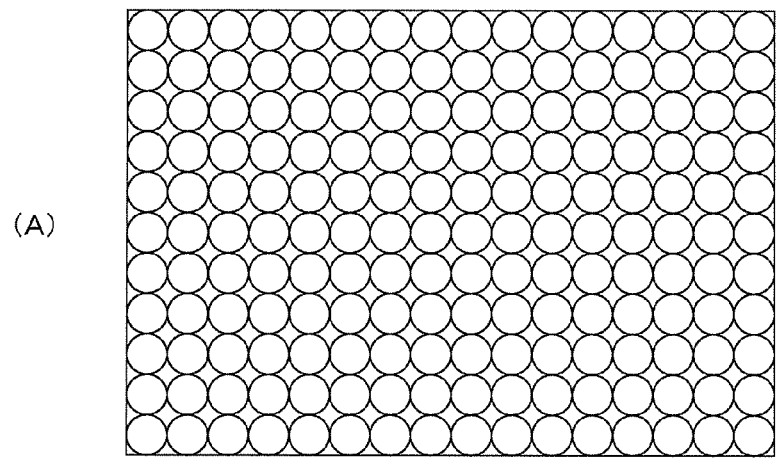
FIGS. 11(A) to 11(E) are diagrams for describing signal processing of a received signal according to a fifth embodiment.
Figure 11:
Figure 11:
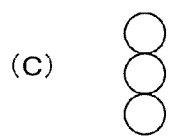
Figure 11:
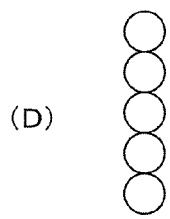
Figure 11:
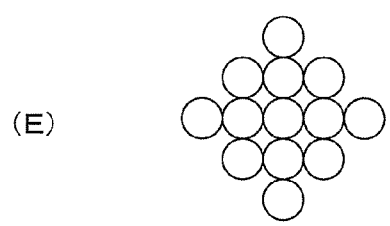
Figure 11:
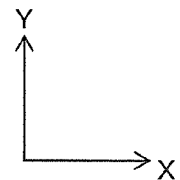

Next, a fifth embodiment of the present invention will be described. An antenna device 1d according to the fifth embodiment has a similar configuration to the antenna device 1c according to the fourth embodiment except below points. That is, the antenna device 1d provides an array antenna 51 in which a plurality of receiving antenna elements $50_1$ to $50_n$ are arranged in the two dimension form as illustrated in FIG. 11(A). Further, the antenna device 1d provides a plurality of amplitude modulators $60_1$ to $60_n$ and frequency band extraction filters $120_1$ to $120_n$ respectively corresponding to receiving antenna elements $50_1$ to $50_n$. The antenna device 1d according to the fifth embodiment performs a similar operation to the antenna device 1c according to the fourth embodiment except an operation described below. FIG. 11 is a diagram for describing signal processing of the antenna device 1d according to the fifth embodiment. The following description will proceed with the antenna device 1d mounted in a vehicle.

Figure 12:
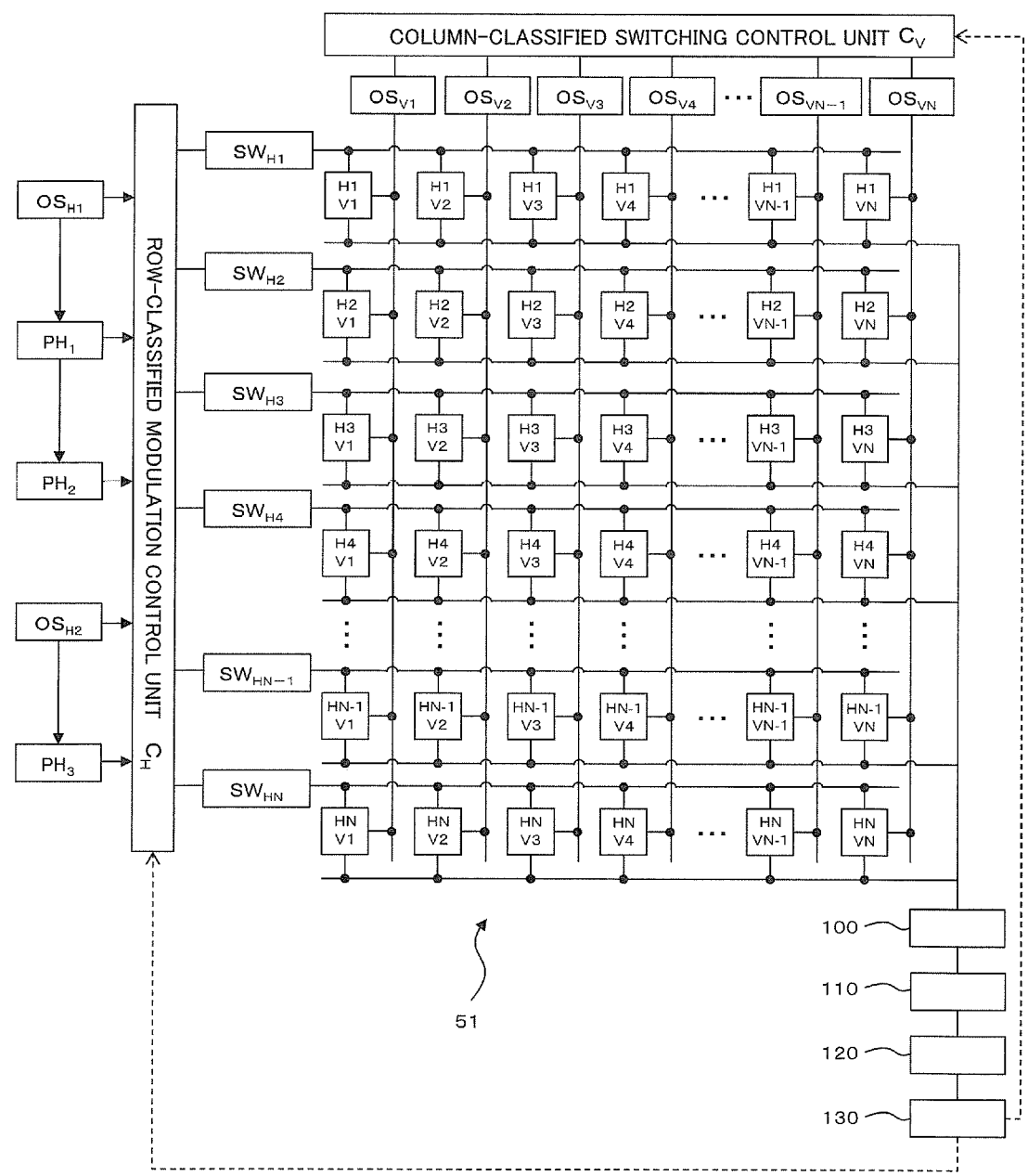
FIG. 12 is a diagram illustrating a circuit configuration of an antenna device according to the fifth embodiment.

FIG. 12 is a diagram illustrating a circuit configuration of the antenna device 1d according to the fifth embodiment. In the fifth embodiment, the antenna device 1d differs in a configuration from the antenna device 1 illustrated in FIG. 5 in that two row side oscillators $OS_{H1}$ and $OS_{H2}$ and three phase shifters PH1, PH2, and PH3 are arranged.

FIG. 13 is a table illustrating frequencies and phases of the row-classified signals that are output from a first row side oscillator $OS_{H1}$, a second row side oscillator $OS_{H2}$, a first phase shifter PH1, a second phase shifter PH2, and a third phase shifter PH3 illustrated in FIG. 12 to receiving antenna element circuits $S_{H1V1}$ to $S_{HNVN}$. For example, in the example illustrated in FIG. 13, the row-classified switching control unit $C_H$ causes the first row side oscillator $OS_{H1}$ to generate a row-classified signal in which a frequency is 210 kHz, and a phase is 0°, and transmits the generated row-classified signal to the receiving antenna element circuits $S_{H1V1}$ to $S_{H1VN}$ of the first row. Further, the row-classified switching control unit $C_H$ transmits the row-classified signal generated by the first row side oscillator $OS_{H1}$ to the first phase shifter PH1 and the second phase shifter PH2 so that row-classified signals of different phases are generated. Specifically, the row-classified switching control unit $C_H$ causes the first phase shifter PH1 to generate the row-classified signal of the frequency 210 kHz and the phase 60°, and causes the second phase shifter PH2 to generate the row-classified signal of the frequency 210 kHz and the phase 120° as illustrated in FIG. 13. Then, the row-classified signal of the frequency 210 kHz and the phase 60° generated by the first phase shifter PH1 is transmitted to the receiving antenna element circuits $S_{H2V1}$ to $S_{H2VN}$ of the second row, and the row-classified signal of the frequency 210 kHz and the phase 120° generated by the second phase shifter PH2 is transmitted to the receiving antenna element circuits $S_{H3V1}$ to $S_{H3VN}$ of the third row.

Further, in the example illustrated in FIG. 13, the row-classified switching control unit $C_H$ causes the second row side oscillator $OS_{H2}$ to generate the row-classified signal of the frequency 215 kHz and the phase 60°, and the generated the row-classified signal is transmitted to the receiving antenna element circuits $S_{H4V1}$ to $S_{H4VN}$ of the fourth row. Furthermore, the row-classified switching control unit $C_H$ transmits the row-classified signal generated by the second row side oscillator $OS_{H2}$ to the third phase shifter PH3, and causes the third phase shifter PH3 to generate the row-classified signal of the frequency 215 kHz and the phase 120° as illustrated in FIG. 13. The row-classified signal of the frequency 215 kHz and the phase 120° generated by the third phase shifter PH3 is transmitted to the receiving antenna element circuits $S_{H5V1}$ to $S_{H5VN}$ of the fifth row.

As described above, in the fifth embodiment, the switches $SW_{H1}$ to $SW_{H5}$ of the five rows are simultaneously set to the ON state, and the row-classified signals having the different frequencies and phases are simultaneously transmitted to the receiving antenna element circuits $S_{H1V1}$ to $S_{H5VN}$ of the five rows. Similarly, the row-classified signals having the different frequencies and phases are simultaneously transmitted to the receiving antenna element circuits $S_{H6V1}$ to $S_{HNVN}$ of the remaining rows for every five rows.

Further, in the fifth embodiment, since the column-classified signals having the different frequencies are transmitted in units of columns through the column-classified oscillators $OS_{V1}$ to $OS_{VN}$, the detection signals having the different frequencies and phases are output from the receiving antenna element circuits of the five rows. Thus, in the fifth embodiment, it is possible to generate one separable synthetic signal from the received signals of the receiving antenna element circuits of the five rows.

The control device 130 controls the amplitude modulators $60_1$ to $60_n$ such that the amplitude modulators corresponding to the three receiving antenna elements consecutively arranged in the vertical direction (the Y direction) modulate the received signals to have the same frequency when the vehicle speed is 40 km/h or higher and less than 50 km/h. In other words, when the vehicle speed is 50 km/h or higher, the control device 130 controls the frequencies modulated by the amplitude modulators $60_1$ to $60_n$ such that one received signal is acquired in units of pixels as illustrated in FIG. 11(B). When the vehicle speed is 40 km/h or higher and less than 50 km/h, the control device 130 controls the frequencies modulated by the amplitude modulators $60_1$ to $60_n$ such that one received signal is acquired in units of three pixels that are consecutive in the vertical direction as illustrated in FIG. 11(C).

Further, in the fifth embodiment, when the vehicle speed is 30 km/h or higher and less than 40 km/h, the control device 130 controls the amplitude modulators $60_1$ to $60_n$ such that the amplitude modulator corresponding to the five receiving antenna elements consecutively arranged the vertical direction (the Y direction) modulate the received signals to have the same frequency as illustrated in FIG. 11(D). When the vehicle speed is 20 km/h or higher and less than 30 km/h, the control device 130 controls the amplitude modulators $60_1$ to $60_n$ such that the amplitude modulators corresponding to the 13 receiving antenna elements consecutively arranged in the vertical direction (the Y direction) and the horizontal direction (the X direction) modulate the received signals to have the same frequency as illustrated in FIG. 11(E).

As described above, in the fifth embodiment, the frequency at which each of the amplitude modulators $60_1$ to $60_n$ modulates the received signal is controlled according to the vehicle speed. Here, when the vehicle speed is fast, the object flows backward in a short time, and thus when two or more received signals received by the receiving antenna elements $50_1$ to $50_n$ are synthesized, a correspondence relation between the received signal received by each receiving antenna element and the object becomes ambiguous. For example, in the present embodiment, the array antenna in which the plurality of antenna elements $50_1$ to $50_n$ are arranged in the two dimension form is provided, and an image can be generated on the basis of the outputs of the plurality of antenna elements $50_1$ to $50_n$. When the vehicle speed is fast, if the two or more received signals received by the receiving antenna elements $50_1$ to $50_n$ are synthesized, an image becomes blur, and it is difficult to determine the object. In this regard, in the present embodiment, when the vehicle speed is fast (for example, when the vehicle speed is 50 km/h or higher), the amplitude modulators $60_1$ to $60_n$ modulate the received signals to have the different frequencies (that is, the pixel synthesis is not performed). Thus, even when the vehicle speed is fast, it is possible to detect the object on the basis of the received signals with a relatively high degree of accuracy. On the other hand, when the vehicle speed is slow, the object does not move at a high speed in an imaging range, and thus even when the received signals are synthesized through a plurality of pixels, the received signal corresponding to each object can be obtained. In this regard, when the vehicle speed is slow, the amplitude modulators $60_1$ to $60_n$ modulate the two or more received signals to have the same frequency, and thus it is possible to acquire the received signal on which the influence of the noise is small.

Further, in the fifth embodiment, even when the vehicle speed is fast, an image in the vertical direction hardly flows, and thus the pixels (the outputs of the receiving antenna elements) in the vertical direction are synthesized more preferentially than those in the horizontal direction. In other words, when the vehicle speed is 40 km/h or higher and less than 50 km/h, the frequencies of the amplitude modulators $60_1$ to $60_n$ are controlled such that one received signal is obtained in units of three pixels consecutive in the vertical direction as illustrated in FIG. 11(C). Further, when the vehicle speed is 30 km/h or higher and less than 40 km/h, the amplitude modulators $60_1$ to $60_n$ are controlled such that one received signal is obtained in units of five pixels consecutive in the vertical direction as illustrated in FIG. 11(D). When the vehicle speed is 20 km/h or higher and less than 30 km/h, the amplitude modulators $60_1$ to $60_n$ are controlled such that one received signal is obtained in units of 13 pixels consecutive in the vertical direction and the vertical direction as illustrated in FIG. 11(E). Thus, it is possible to appropriately acquire the received signal according to the speed of the vehicle.

Further, in the fifth embodiment, the vertical direction and the horizontal direction in the receiving area of the array antenna 51 are identical to the vertical direction (the Y-axis direction) and the horizontal direction (the X-axis direction) of the array antenna 51 illustrated in FIG. 11. But when the vertical direction and the horizontal direction in the receiving area of the array antenna 51 are not identical to the vertical direction (the Y-axis direction) and the horizontal direction (the X-axis direction) of the array antenna 51 illustrated in FIG. 11, the "vertical direction (Y-axis direction)" in the above description may be set as an array direction of the array antenna 51 corresponding to the vertical direction in the receiving area of the array antenna 51, and the "horizontal direction (X-axis direction)" in the above description may be set as an array direction of the array antenna 51 corresponding to the horizontal direction in the receiving area of the array antenna 51. Further, in the above example, the configuration of modulating the two or more received signals to have the same frequency when the vehicle speed is slow, but when the phases of the two or more received signals are different, and the vehicle speed is slow, the two or more received signals may be modulated to have the same frequency and the same phase.

Further, in the fifth embodiment, the two row side oscillators $OS_{H1}$ and $OS_{H2}$ and the three phase shifters PH1, PH2, and PH3 are arranged. The row-classified signals having the different frequency and the different phase are output from the first row side oscillator $OS_{H1}$, the second row side oscillator $OS_{H2}$, the first phase shifter PH1, the second phase shifter PH2, and the third phase shifter PH3 to the receiving antenna element circuits $S_{H1V1}$ to $S_{HNVN}$ in units of rows. Thus it is possible to simultaneously process the received signals of the five rows, and it is possible to increase the detection accuracy of the object accordingly.

Further, in the fifth embodiment, a plurality of received signals output from a plurality of receiving antenna elements 50 (pixels) included in a predetermined receiving area is synthesized according to the speed of the vehicle, but the present invention is not limited to this configuration. A configuration may be provided that a plurality of received signals consecutively output from the same receiving antenna element 50 at different times are synthesized according to the speed of the vehicle. For example, when the speed of the vehicle is a predetermined speed or higher, the received signal that is received currently (at a time p) may be acquired without changed, and when the speed of the vehicle is lower than the predetermined speed, the received signal that received currently (at the time p) and the received signal that has been received previously (at a time p−1) may be synthesized. As described above, as a plurality of received signals consecutively output from the same receiving antenna element 50 are synthesized according to the speed of the vehicle, it is possible to acquire the received signal on which the influence of the noise is small, and it is possible to increase the resolution of the image in the horizontal direction to be higher than when the outputs of the pixels in the horizontal direction are synthesized. Thus, for example, when a shape of a road surface is detected, it is possible to detect the shape of the road surface without distortion.

Figure 14:
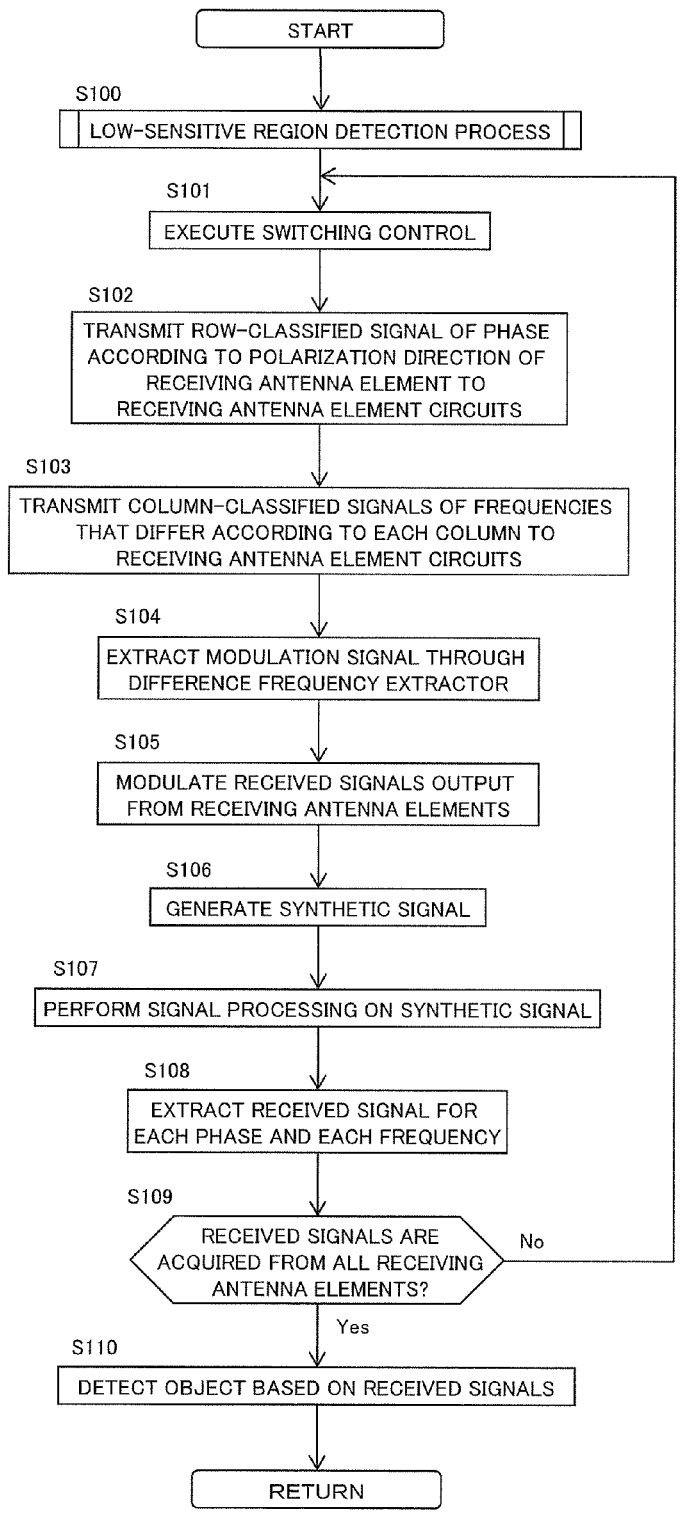
FIG. 14 is a flowchart illustrating an operation of an antenna device according to a sixth embodiment.

Next, a sixth embodiment of the present invention will be described. The antenna device 1 according to the sixth embodiment differs from that of the first embodiment as below points. In the sixth embodiment, the antenna device 1 detects a region in which the output value of the received signal is small as a low-sensitive region. When the received signals are output from the low-sensitive region, the output values of the received signals output from the receiving antenna elements 50 included in the low-sensitive region are added. An operation of the antenna device 1 according to the sixth embodiment will be described below with reference to FIG. 14. FIG. 14 is a flowchart illustrating an operation of the antenna device 1 according to the sixth embodiment.

Figure 15:
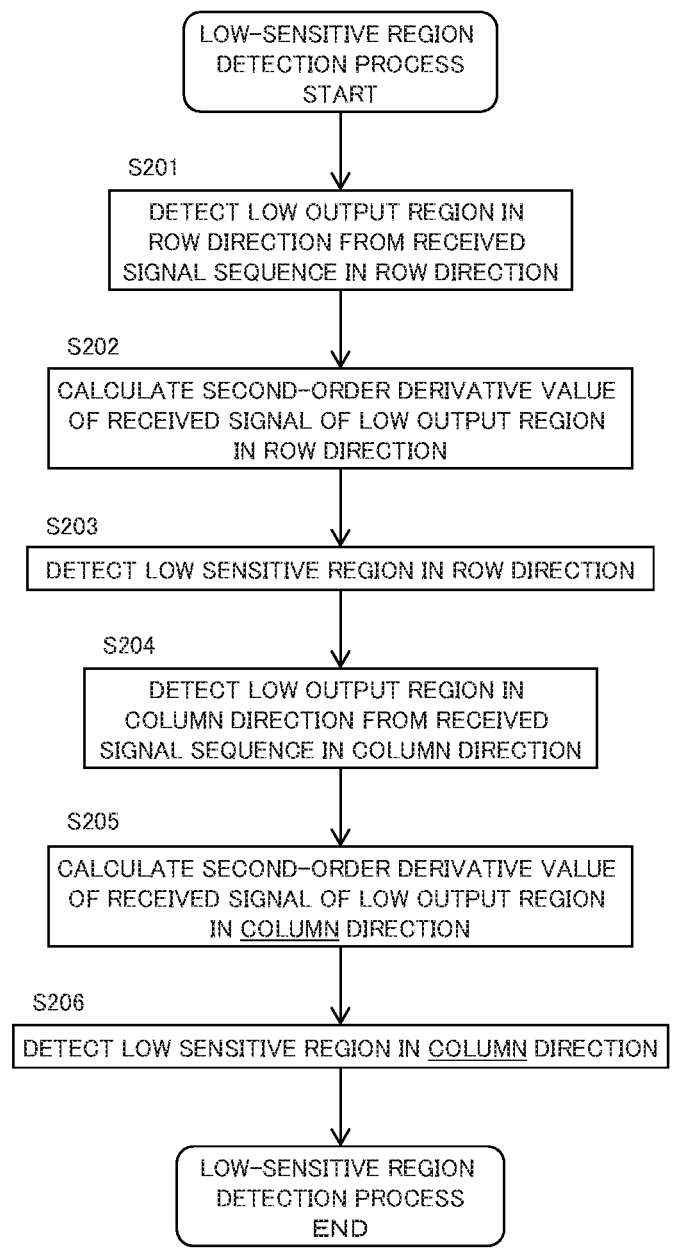
FIG. 15 is a flowchart illustrating a low-sensitive region detection process of step S100.

As illustrated in FIG. 14, in the operation of the antenna device 1 according to the sixth embodiment, a low-sensitive region detection process of step S100 is performed in addition to the operation of the antenna device 1 of FIG. 7 according to the first embodiment. The low-sensitive region detection process of step S100 will be described below with reference to FIG. 15. FIG. 15 is a flowchart illustrating the low-sensitive region detection process of step S100. In the low-sensitive region detection process, for example, the low-sensitive region is detected using the received signal detected at the time of a previous process.

First, in step S201, the control device 130 detects a low output region in the row direction. Specifically, the control device 130 sets a sequence of received signals of the receiving antenna elements 50 in the row direction as a received signal sequence in the row direction. Then, the control device 130 detects a region in which the output value (power) of the received signal is equal to a determination value s1 or less among the received signal sequence in the row direction as the low output region in the row direction.

Figure 16:
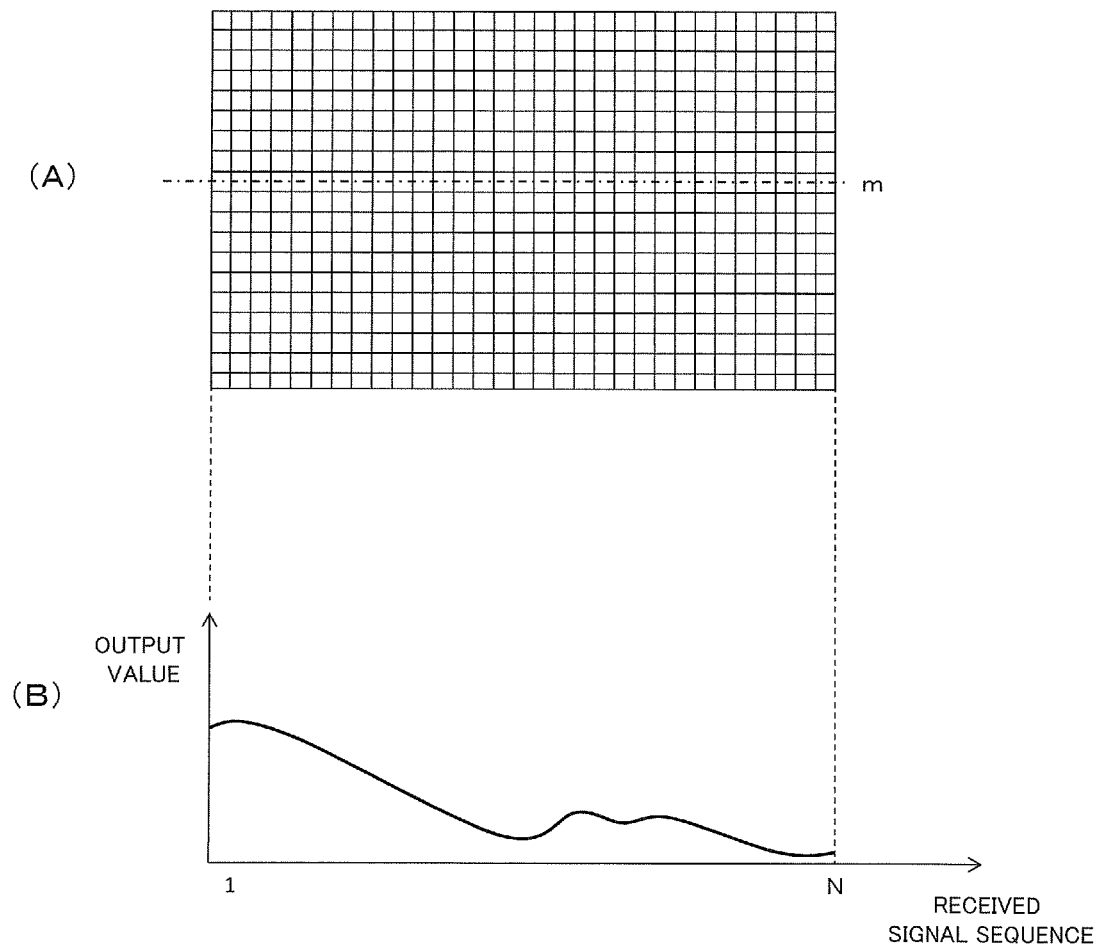
FIG. 16(A) is a front view of an array antenna.
FIG. 16(B) is a diagram illustrating an example of a received signal sequence in a row direction.

Here, FIG. 16(A) is a front view of the array antenna 51. FIG. 16(B) is a diagram illustrating an example of output values of a sequence of received signals output from receiving antenna element circuits $S_{HmV1}$ to $S_{HmVN}$ of an m-th row of the array antenna 51, that is, output values of the received signal sequence in the row direction. As described above, the control device 130 first acquires the received signal sequence in the row direction from the receiving antenna element circuits $S_{H1V1}$ to $S_{HNVN}$ of rows H1 to HN. Then, the control device 130 detects the low output region in which the output value (power) of the received signal is equal to the determination value s1 or less from the received signal sequence in each row direction in units of rows.

Figure 17:
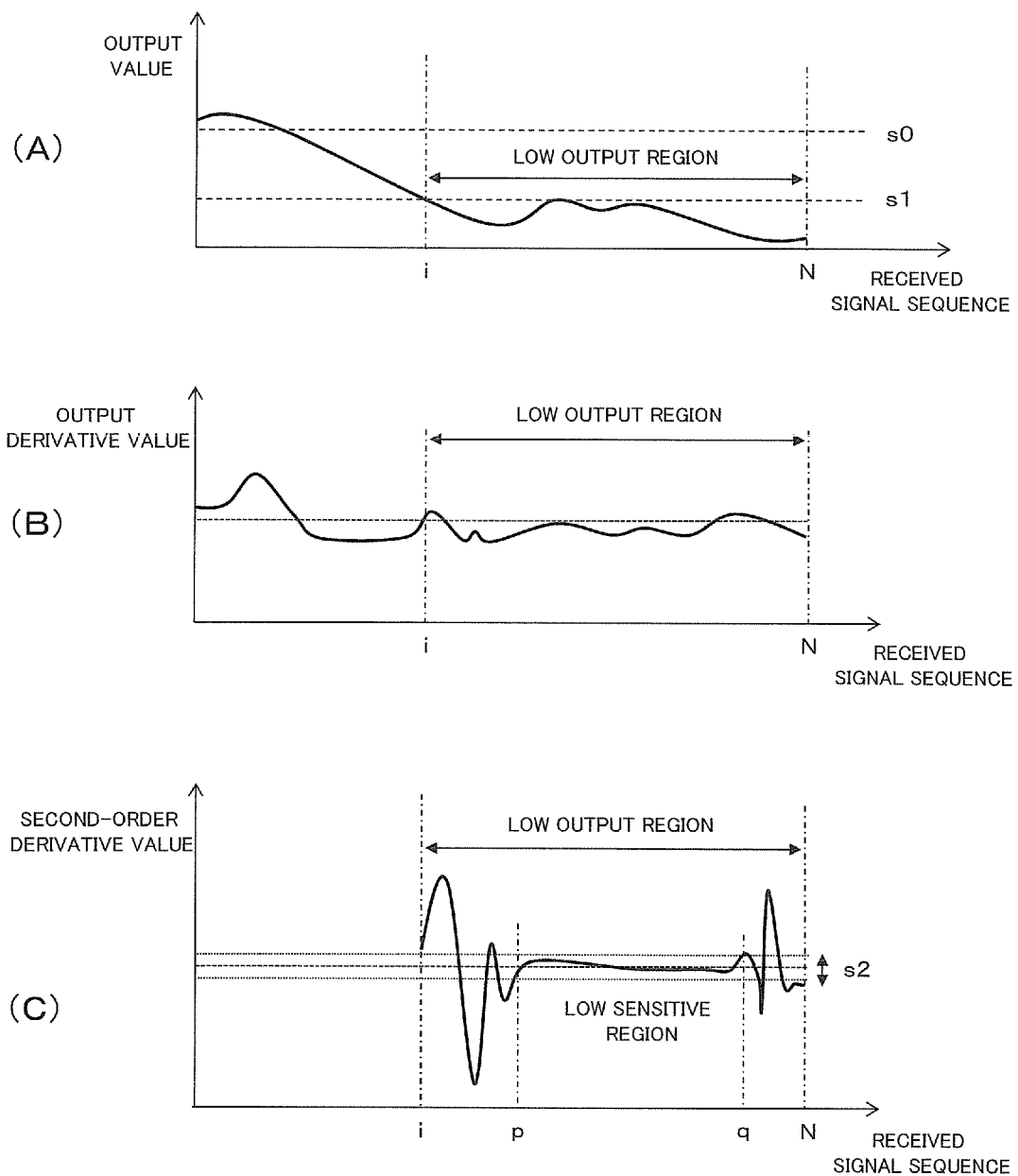
FIGS. 17(A) to 17(C) are diagrams for describing a low-sensitive region detection method.

FIG. 17(A) is a graph illustrating the received signal sequence in the row direction, similarly to FIG. 16(B). In the graph illustrated in FIG. 17(A), an upper limit value s0 and the determination value s1 are illustrated in addition to content of the graph of FIG. 16(B). In the present embodiment, the received signal exceeding the upper limit value s0 is limited so that a remarkably high-temperature object or the like is not detected as the target object. In the present embodiment, for example, when an output value of the received signal, obtained by receiving incident waves from a concrete having an emissivity of 0.95 or more at a temperature of 300 K in a directly confronting state, is used as a reference value. Then, a value that is twice as high as the reference value may be set as the upper limit value s0.

The determination value s1 is a value used for determining the low output region in which the output value of the received signal is low, and, for example, may be set to a value that is ½ of the reference value.

For example, in the example illustrated in FIG. 17(A), the power of the received signals of a receiving antenna element circuit $S_{HmVi}$ of an i-th column to the receiving antenna element circuit $S_{HmVN}$ of the N-th column among the receiving antenna element circuits $S_{HmV1}$ to $S_{HmVN}$ of the m-th row are equal to the determination value s1 or lower. Then, the receiving antenna element circuit $S_{HmVi}$ of the i-th column to the receiving antenna element circuit $S_{HmVN}$ of the N-th column are detected as the low output region. Similarly, the control device 130 detects the low output region even for the other rows than the m-th row.

In step S202, the control device 130 performs a second-order derivative operation on the received signal sequence of the low output region in the row direction detected in step S201, and calculates a second-order derivative value of the low output region in the row direction. Here, FIG. 17(B) is a graph illustrating an output derivative value obtained by differentiating the received signal sequence of the low output region in the row direction. FIG. 17(C) is a graph illustrating a second-order derivative value obtained by performing second-order derivative on the received signal sequence of the low output region in the row direction. The control device 130 performs second-order derivative on the received signal sequence of the low output region in the row direction for each row in which the low output region is detected, and calculates a second-order derivative value of the low output region in the row direction. This process may be omitted for a row in which the low output region is not detected.

In step S203, the control device 130 determines whether or not the received signal sequence of the second-order derivative value of the low output region in the row direction calculated in step S202 exceeds a determination range s2. Then, a region in which the second-order derivative value does not exceed the determination range s2 is detected as the low-sensitive region. For example, in the example illustrated in FIG. 17(C), among the receiving antenna element circuits $S_{HmV1}$ to $S_{HmVN}$ of the m-th row, second-order derivative values of a received signal of a receiving antenna element circuit $S_{HmVp}$ of a p-th column to a received signal of a receiving antenna element circuit $S_{HmVq}$ of a q-th column are within the determination range s2. Thus the receiving antenna element circuit $S_{HmVp}$ of the p-th column to the receiving antenna element circuit $S_{HmVq}$ of the q-th column are detected as the low-sensitive region.

In step S204, similarly to step S201, a sequence of received signals in the column direction is set as a received signal sequence in the column direction, and among the received signal sequence in the column direction, a region in which the output value (power) of the received signal is equal to the determination value s1 or less is detected as the low output region in the column direction. Further, in step S205, similarly to step S202, the second-order derivative value of the received signal sequence of the low output region in the column direction is calculated for each column. Then, in step S206, similarly to step S203, a region in which the second-order derivative value of the received signal sequence of the low output region in the column direction does not exceed the determination range s2 is detected as the low-sensitive region in the column direction for each column.

Then, the process returns to FIG. 14, in step S101, switching control is performed on the basis of the result of the low-sensitive region detection process of step S100. Here, FIG. 18 is a diagram for describing a received signal synthesis method in the low-sensitive region.

Figure 18:
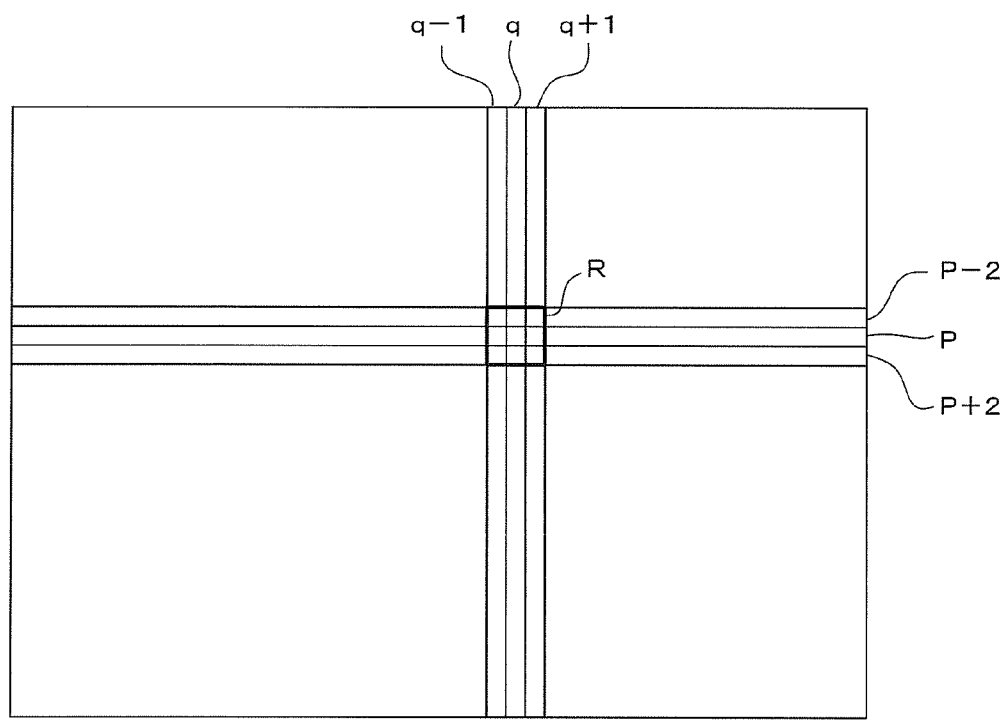
FIG. 18 is a diagram for describing a received signal synthesis method in a low-sensitive region.

For example, when the low-sensitive region is detected from a received signal sequence of a p-th row in the low-sensitive region detection process of step S100 as illustrated in FIG. 18, the control device 130 causes the row-classified switching control unit $C_H$ to set a switch $SW_{HP}$ connected to receiving antenna element circuits $S_{HpV1}$ to $S_{HpVN}$ of the p-th row to the ON state and to receive the incident waves in the same polarization direction as the receiving antenna element circuits $S_{HpV1}$ to $S_{HpVN}$ of the p-th row. Further, the control device 130 causes the row-classified switching control unit $C_H$ to set switches $SW_{HP+2}$ and $S_{WHP-2}$ connected to receiving antenna element circuits $S_{Hp+2V1}$ to $S_{Hp+2VN}$ and $S_{Hp-2V1}$ to $S_{Hp-2VN}$ of (p+2)-th and (p-2)-th rows close to the p-th row to the ON state as well. Then, the control device 130 transmits the row-classified signal of the same frequency and the same phase from the row side oscillator $OS_H$ or the phase shifter PH through the switches $SW_{HP}$, $SW_{HP+2}$, and $S_{WHP-2}$.

As a result, the detection signals output from the receiving antenna element circuits $S_{HpV1}$ to $S_{HpVN}$, $S_{Hp+2V1}$ to $S_{Hp+2VN}$, and $S_{Hp-2V1}$ to $S_{Hp-2VN}$ of the p-th, (p+2)-th, and (p-2)-th rows have the same frequency and the same phase for each column. Thus when the synthetic signal is generated in step S106, the detection signals of the receiving antenna element circuits $S_{HpV1}$ to $S_{HpVN}$, $S_{Hp+2V1}$ to $S_{Hp+2VN}$, and $S_{Hp-2V1}$ to $S_{Hp-2VN}$ of the p-th, (p+2)-th, and (p-2)-th rows are simultaneously added in the column direction. Consequently, when the received signal is extracted in step S108, each of the received signals of the receiving antenna element circuits $S_{HpV1}$ to $S_{HpVN}$, $S_{Hp+2V1}$ to $SH_{p+2VN}$, and $S_{Hp-2V1}$ to $S_{Hp-2VN}$ of the p-th, (p+2)-th, and (p-2)-th rows is extracted with the power obtained by adding the received signals of the three rows, that is, the p-th, (p+2)-th, and (p-2)-th rows.

Further, in step S103, the column-classified signals having the different frequencies are transmitted to the receiving antenna element circuits $S_{H1V1}$ to $S_{HNVN}$ in units of columns, but in the sixth embodiment, when there is a column corresponding to the low-sensitive region, the control device 130 changes a frequency of a column adjacent to the column corresponding to the low-sensitive region to the same frequency as the frequency of the column corresponding to the low-sensitive region. For example, when the low-sensitive region is detected from a received signal sequence of a q-th column in the low-sensitive region detection process of step S100 as illustrated in FIG. 18, the control device 130 causes the column-classified modulation control unit $C_V$ to control column-classified oscillators $OS_{f1}$ to $OS_{fN}$ such that the column-classified signals having the same frequency are input to receiving antenna element circuits of q-th, (q+1)-th, and (q−1)-th columns.

As a result, the detection signals output from the receiving antenna element circuits of the q-th, (q+1)-th, and (q−1)-th columns have the same frequency for each row. Thus when the synthetic signal is generated in step S106, the received signals of the receiving antenna element circuits of the q-th, (q+1)-th, and (q−1)-th columns are simultaneously added in the row direction Consequently, when the received signal is extracted in step S108, each of the received signals of the receiving antenna element circuits of the q-th, (q+1)-th, and (q−1)-th columns is extracted with a power obtained by adding the received signals of the three columns, that is, the q-th, (q+1)-th, and (q−1)-th columns.

Then, as illustrated in FIG. 18, in the low-sensitive region R in which the p-th, (p+2)-th, and (p−2)-th rows intersect with the q-th, (q+1)-th, and (q−1)-th columns, the received signals of the receiving antenna element circuits $S_{Hp-2Vq-1}$ to $S_{Hp-2Vq+1}$, $S_{HpVq-1}$ to $S_{HpVq+1}$, and $S_{Hp+2Vq-1}$ to $S_{Hp+2Vq-1}$ of the p-th, (p+2)-th, and (p−2)-th rows and the q-th, (q+1)-th, and (q−1)-th columns are modulated to have the same frequency and the same phase. Thus when the synthetic signal is generated in step S106, the received signals of the low-sensitive region R are simultaneously added. Consequently, when the received signal is extracted in step S108, each of the receiving antenna element circuits $S_{Hp-2Vq-1}$ to $S_{Hp-2Vq+1}$, $S_{HpVq-1}$ to $S_{HpVq+1}$, and $S_{Hp+2Vq-1}$ to $S_{Hp+2Vq-1}$ is extracted with a power obtained by adding the received signals of the receiving antenna element circuits $S_{Hp-2Vq'1}$ to $S_{Hp-2Vq+1}$, $S_{HpVq-1}$ to $S_{HpVq+1}$, and $S_{Hp+2Vq-1}$ to $S_{Hp+2Vq-1}$.

As described above, in the sixth embodiment, the low-sensitive region in which the output value of the received signal is low is detected, and the received signals of the low-sensitive region are modulated to have the same phase and the same frequency and synthesized. Thus it is possible to amplify the outputs of the pixels (the receiving antenna elements 50) of the low-sensitive region. As a result, it is possible to appropriately detect the object even in the low-sensitive region in which sensitivity is low.

Next, a seventh embodiment of the present invention will be described. The antenna device 1 according to the seventh embodiment has a similar configuration as the antenna device 1 according to the first embodiment. The antenna device 1 according to the seventh embodiment performs a similar operation to that of the antenna device 1 according to the first embodiment except an operation described below.

In other words, similarly to the first embodiment, the antenna device 1 according to the seventh embodiment includes a first receiving antenna element that mainly receives the incident waves of the horizontal polarized component and a second receiving antenna element that mainly receives the incident waves of the vertical polarized component. On the other hand, in the seventh embodiment, first, the object is detected on the basis of only the received signal output from the first receiving antenna element that mainly receives the horizontal polarized component. Then, when the object is detected on the basis of the horizontal polarized component, the object is detected in further detail on the basis of the received signal output from the first receiving antenna element that mainly receives the horizontal polarized component and the received signal output from the second receiving antenna element that mainly receives the vertical polarized component.

Figure 19:
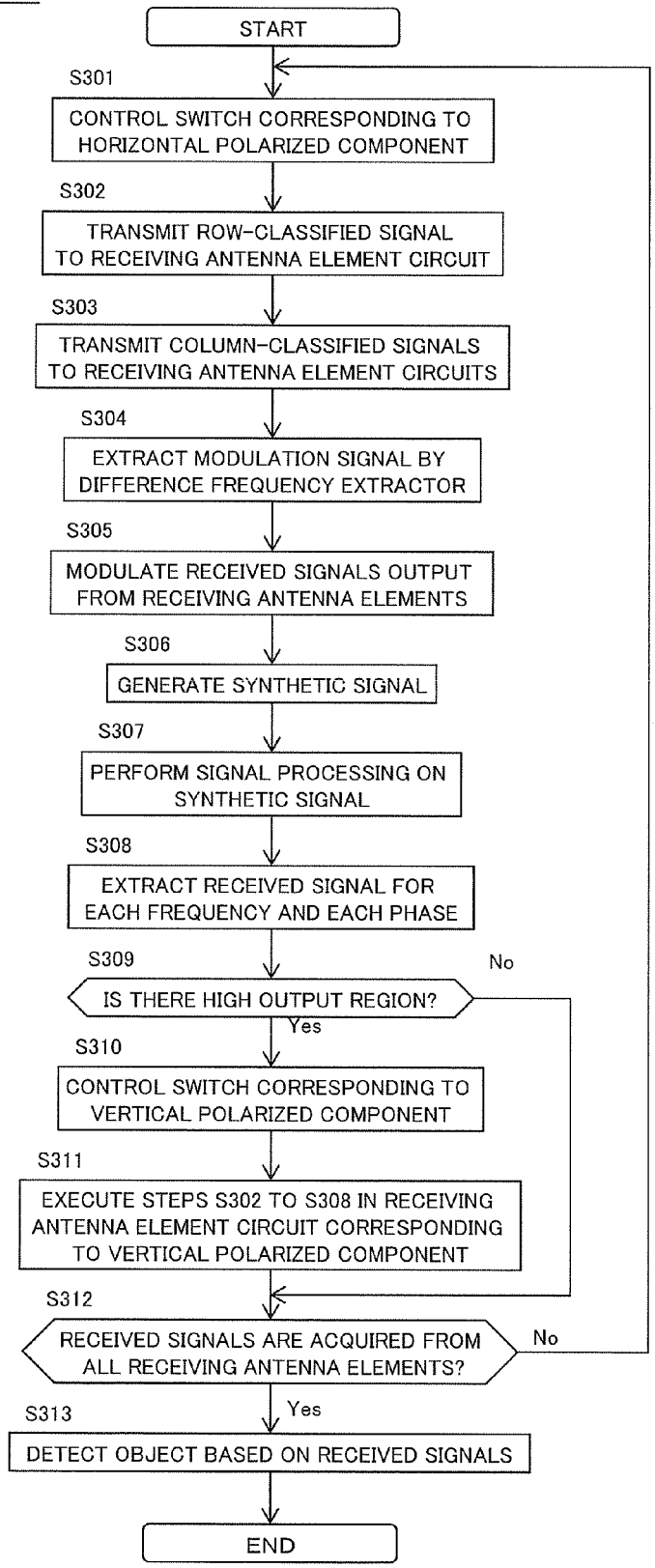
FIG. 19 is a flowchart illustrating an operation of an antenna device according to a seventh embodiment.

Next, a specific operation of the antenna device 1 according to the seventh embodiment will be described with reference to FIG. 19. FIG. 19 is a flowchart illustrating an operation of the antenna device 1 according to the seventh embodiment. The operation of the antenna device 1 illustrated in FIG. 19 is repeatedly performed at regular intervals.

First, in step S301, the row-classified switching control unit $C_H$ performs switching control for the switches $SW_{H1}$, $SW_{H3}$, ..., and $SW_{HN-1}$ corresponding to the first receiving antenna element that mainly receives the horizontal polarized component. In other words, in the seventh embodiment, the row-classified switching control unit $C_H$ first sets sequentially the switches $SW_{H1}$, $SW_{H3}$, ..., and $SW_{HN-1}$ connected to the receiving antenna element circuits $S_{H1V1}$ to $S_{H1VN}$, $S_{H3V1}$ to $S_{H3VN}$, ..., and $S_{HN-1V1}$ to $S_{VH-1VN}$ of the odd-numbered rows that mainly receive the horizontal polarized component to the ON state in order to detect the object by using only the received signal on the basis of the horizontal polarized component.

For example, immediately after the operation of the antenna device 1 illustrated in FIG. 19 is started, the row-classified switching control unit $C_H$ sets the switch $SW_{H1}$ of the first row to the ON state, and sets the remaining switches $SW_{H2}$ to $SW_{HN}$ to the OFF state. Further, when any one of the received signals output from the receiving antenna element circuits $S_{H1V1}$ to $S_{HNVN}$ is determined to have not been acquired in step S312 which will be described later, and the process returns to step S301, a switch $SW_{Hi}$ of an odd-numbered row (an i-th row) that is currently set to the ON state is changed to the OFF state, and a switch $SW_{Hi+2}$ of an odd-numbered row (an (i+2)-th row) next to the switch $SW_{Hi}$ that is currently set to the ON state is set to the ON state.

In step S302, the row-classified switching control unit $C_H$ outputs the row-classified signal to the receiving antenna element circuits $S_{HiV1}$ to $S_{HiVN}$ of the i-th row through the switch $SW_{Hi}$ of the i-th row set to the ON state in step S301.

Further, in steps S303 to S308, processes is performed similarly to steps S103 to S108 of the first embodiment. The column-classified signals having the different frequencies are transmitted to the respectively receiving antenna element circuit in units of columns (step S303). The modulation signal of the frequency according to the difference between the frequency of the row-classified signal and the frequency of the column-classified signal is extracted (step S304). Then, the received signal is modulated by using the modulation signal (step S305). The modulated received signal is synthesized, and one synthetic signal is output (step S306). The synthetic signal undergoes predetermined signal processing (step S307). The received signal is extracted for each frequency and each phase (step S308). The extracted received signal in the row direction is transmitted to the control device 130.

Figure 20:
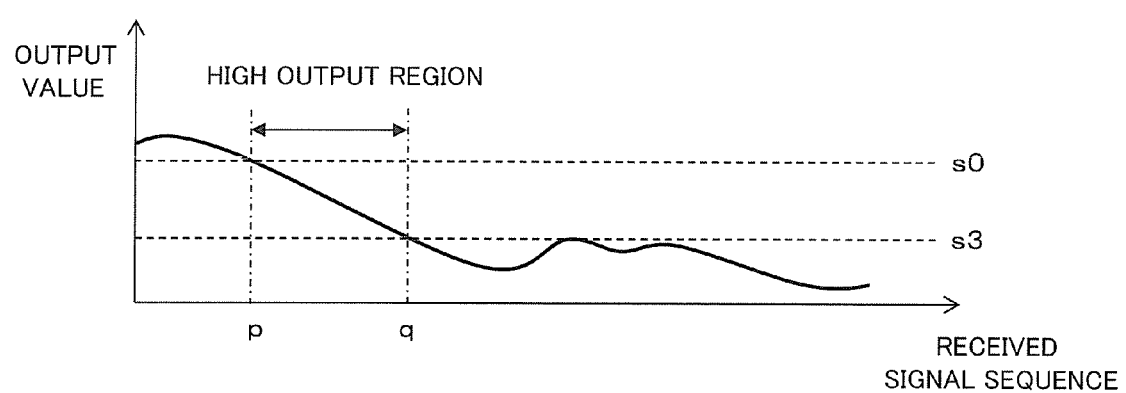
FIG. 20 is a diagram for describing a high output region detection method.

In step S309, the control device 130 determines whether or not there is a high output region in which the power of the received signal is equal to a determination value s3 or more. Specifically, the control device 130 sets a sequence of the received signals in the row direction extracted in step S308 as a received signal sequence. The control device 130 detects a region in which the power of the received signal is equal to the determination value s3 or more in the received signal sequence as the high output region. Here, FIG. 20 is a diagram illustrating an example of the received signal sequence output from the receiving antenna element circuits $S_{HiV1}$ to $S_{HiVN}$ of the i-th row. In the example illustrated in FIG. 20, in the receiving antenna element circuit $S_{HiVp}$ of the p-th column to the receiving antenna element circuit $S_{HiVq}$ of the q-th column, the power of the received signal is equal to the determination value s3 or more. Thus the receiving antenna element circuit $S_{HiVp}$ to $S_{HiVq}$ of the p-th column to the q-th column are detected as the high output region.

Then, in step S309, when the high output region is detected, the control device 130 determines that there is likely to be an object and proceeds step S310 to detect the object with a higher degree of accuracy. On the other hand, when no high output region is detected, the control device 130 determines that there is unlikely to be an object and proceeds step S312.

In step S310, the row-classified switching control unit $C_H$ performs switching control for the switch $SW_{H2}$, $SW_{H4}$, ..., and $SW_{HN}$ corresponding to the second receiving antenna element that mainly receives the vertical polarized component. In other words, in the seventh embodiment, the row-classified switching control unit $C_H$ sets a switch corresponding to a row next to a row in which the high output region is detected to the ON state among the switches connected to the receiving antenna element circuits $S_{H2V1}$ to $S_{H2VN}$, $S_{H4V1}$ to $S_{H4VN}$, . . . , and $S_{HNV1}$ to $S_{VHVN}$ of the even-numbered rows that mainly receive the vertical polarized component.

Then, in step S311, the process of steps S302 to S308 is performed in the receiving antenna element circuits $S_{Hi+1V1}$ to $S_{Hi+1VN}$ of the row (the (i+1)-th row) next to the row in which the high output region is detected. In other words, the row-classified switching control unit $C_H$ transmits the row-classified signals having the phase and frequency according to the vertical polarized components received by the receiving antenna element circuits $S_{Hi+1V1}$ to $S_{Hi+1VN}$ of the (i+1)-th row (for example, the row-classified signal of the frequency 210 kHz and the phase 90°) to the receiving antenna element circuits $S_{Hi+1V1}$ to $S_{Hi+1VN}$ of the (i+1)-th row through the switch $SW_{Hi+1}$ set to the ON state in step S310 (step S302). Further, the column-classified modulation control unit $C_V$ transmits the column-classified signals having the different frequencies to the receiving antenna element circuits $S_{Hi+1V1}$ to $S_{Hi+1VN}$ of the (i+1)-th row in units of columns (step S303). Then, the modulation signal according to the difference between the frequency of the row-classified signal and the frequency of the column-classified signal is extracted (step S304), and the received signals output from the receiving antenna element circuits $S_{Hi+1V1}$ to $S_{Hi+1VN}$ are modulated on the basis of the extracted modulation signal (step S305). Further, a plurality of modulated received signals are synthesized (step S306), undergo predetermined signal processing (step S307), and then the received signal is extracted for each frequency and each phase (step S308).

As a result, in the sixth embodiment, near the high output region in which there is likely to be the object, it is possible to acquire the received signals output from the receiving antenna element circuits $S_{HiV1}$ to $S_{HiVN}$ of the i-th row that mainly receive the horizontal polarized component and the received signals output from the receiving antenna element circuits $S_{Hi+1V1}$ to $S_{Hi+1VN}$ of the (i+1)-th row that mainly receive the vertical polarized component. Then, when the received signals have been acquired in all the receiving antenna element circuits that mainly receive the horizontal polarized component and all the receiving antenna element circuits that are arranged in the row next to the row in which the high output region is detected and mainly receive the vertical polarized component (Yes in step S312). The process proceeds to step S313, and various kinds of control such as the object detection are performed.

As described above, in the seventh embodiment, the region in which output value of the received signal is equal to the determination value s3 or higher is detected as the high output region on the basis of the received signal of the horizontal polarized component. Then, when the high output region has been detected on the basis of the horizontal polarized component, it is determined that there is likely to be the object, and the object is detected by using the received signal on the basis of the vertical polarized component in addition to the received signal on the basis of the horizontal polarized component. Thus, in the seventh embodiment, when there is the object, it is possible to detect the object with a high degree of accuracy on the basis of the received signal of the horizontal polarized component and the received signal of the vertical polarized component. Further, when there is no object, the extraction of the received signal of the vertical polarized component is omitted, and thus it is possible to reduce an electric power consumption and a processing load in the antenna device 1.

The embodiments have been described to facilitate understanding of the present invention and are not intended to limit the present invention. Therefore, the elements disclosed in the above embodiments are intended to include all design changes or equivalents belonging to the technical scope of the present invention.

For example, in the first embodiment, the configuration of extracting the received signals from the synthetic signal by using the frequency band extraction filters 120a to 120e has been described as an example, but the present invention is not limited to this configuration. For example, a configuration of extracting the received signals from the synthetic signal by using a computing unit that performs the fast Fourier transform instead of the frequency band extraction filters 120a to 120e may be provided. In this case, it is possible to configure the circuit for extracting the received signals from the synthetic signal with a relatively small size, and thus it is possible to implement the space saving of the entire antenna device.

Further, in the above embodiments, the configuration in which the amplitude modulators 60a to 60e are arranged immediately behind the receiving antenna elements 50a to 50e has been described as an example, but the present invention is not limited to this configuration. For example, a configuration in which the high frequency amplifiers 70a to 70e are arranged immediately behind the receiving antenna elements 50a to 50e may be provided. In this case, it is possible to suppress the loss of the high frequency amplifiers 70a to 70e to the minimum.

Further, in the above embodiments, the configuration in which the transmission signal generating unit 10, the voltage controlled oscillator 20, the distributor 30, and the transmission antenna element 40 are arranged has been described as an example. However, a configuration in which the received signal generating unit 10, the voltage controlled oscillator 20, the distributor 30, and the transmission antenna element 40 are not arranged may be provided. In this case, the incident waves coming from the object are received by the receiving antenna elements 50a to 50e, and thus it is also possible to appropriately perform signal processing on the received signal while achieving the space saving.

Further, in the above embodiments, the configuration in which the first receiving antenna element that mainly receives the incident waves of the vertical polarized component and the second receiving antenna element that mainly receives the incident waves of the horizontal polarized component are arranged as the receiving antenna element 50 has been described as an example, but the present invention is not limited to this configuration. For example, a configuration in which, when an angle of the vertical polarized component is set to 0°, a first receiving antenna element that receives a vertical polarized component of 0°, a second receiving antenna element that receives linearly polarized waves of 60°, and a third antenna element that receives linearly polarized waves of 120° are arranged may be provided. Similarly, a configuration in which a receiving antenna element that receives incident waves of linearly polarized waves and elliptically polarized waves of various directions is arranged may be provided.

The receiving antenna elements 50a to 50f of the above embodiments correspond to an antenna element of the present invention, the amplitude modulators 60a to 60e correspond to a modulating unit of the present invention, the synthesizer 90 corresponds to a synthesizing unit of the present invention, the low frequency amplifier 100 and the A/D converter 110 (further, the high frequency amplifier 70 and the detector 80 of the third to fifth embodiments)

correspond to a signal processing unit of the present invention, the frequency band extraction filters 120a to 120e and the synchronous detectors 140a to 140e correspond to an extracting unit of the present invention, and the control device 130 corresponds to a control unit of the present invention.

The invention claimed is:

1. An antenna device comprising:
a plurality of antenna elements respectively configured to receive incident waves coming from an object and output a first received signal on a basis of received incident waves, the plurality of antenna elements including at least a first antenna element that receives incident waves of a predetermined polarization direction and a second antenna element that receives incident waves of a polarization direction different from the incident waves received by the first antenna element;
a plurality of modulating units respectively configured to modulate the first received signal output from a respective antenna element into a second received signal, such that the second received signal has a frequency corresponding to a position of the respective antenna element in the antenna device and has a phase corresponding to the polarization directions of the incident waves received by the respective antenna element, so that a plurality of second received signals have a plurality of different frequencies corresponding to the respective position of the respective antenna element in the antenna device and have phases corresponding to the polarization directions of the incident waves received by the plurality of antenna elements;
a synthesizing unit configured to synthesize the plurality of second received signals respectively modulated by the plurality of modulating units so as to generate one synthetic signal;
a signal processing unit configured to perform signal processing on the synthetic signal; and
an extracting unit configured to extract third received signals from the synthetic signal on which has been performed the signal processing, each of the third received signals having a frequency and a phase equal to the frequency and the phase of each of the plurality of second received signals modulated by the plurality of modulating units.

2. The antenna device according to claim 1, wherein:
the first antenna element mainly receives the incident waves of a horizontally polarized component, and
the second antenna element mainly receives the incident waves of a vertically polarized component.

3. The antenna device according to claim 1, further comprising:
an array antenna in which the plurality of antenna elements is arranged in a two dimensional form, wherein the plurality of modulating units respectively modulates the first received signal output from the respective antenna element into the second received signal, such that the second received signal has a frequency corresponding to a position of the respective antenna element on the array antenna.

4. The antenna device according to claim 3, wherein the modulating unit extracts a difference between a frequency allocated to a row in which the respective antenna element is arranged and a frequency allocated to a column in which the respective antenna element is arranged as the frequency corresponding to the position of the respective antenna element on the array antenna.

5. The antenna device according to claim 3, wherein the plurality of modulating units modulates each first received signal output from the plurality of antenna elements corresponding to a predetermined reception range of the array antenna into second received signals having the same frequency and the same phase.

6. The antenna device according to claim 3, wherein the plurality of modulating units modulates each first received signal output from the antenna elements consecutively arranged in an array direction corresponding to a vertical direction of a reception range of the array antenna into each second received signal having the same frequency and the same phase.

7. The antenna device according to claim 1, wherein the plurality of modulating units modulate each first received signal into second received signals having frequencies within a specific frequency band different from a frequency band of frequencies before modulating.

8. The antenna device according to claim 7, wherein the specific frequency band is decided on a basis of a conversion time period of the second received signal at which the second received signal is converted from an analog signal to a digital signal and/or a receiving time period of the incident waves.

9. The antenna device according to claim 1, wherein the extracting unit extracts the third received signals from the synthetic signal by performing phase synchronization on the synthetic signal using phases of the plurality of second received signals modulated by the modulating units.

10. The antenna device according to claim 1, further comprising:
a control unit configured to perform a modulation control process for controlling the plurality of modulating units so that the plurality of modulating units respectively modulate the first received signals output from each of the plurality of antenna elements into the second received signals having the same frequency.

11. The antenna device according to claim 10, wherein the control unit is further configured to:
detect power of the first received signal output from each of the plurality of antenna elements;
determine a degree of influence of a noise on the first received signal output from each of the plurality of antenna elements on a basis of an error of the power; and
perform the modulation control process when the degree of the influence of the noise is determined to be equal to a predetermined value or more.

12. The antenna device according to claim 10, further comprising:
an acquiring unit configured to acquire a moving speed of a moving object equipped with the antenna device,
wherein the control unit modulates the first received signals output from the plurality of antenna elements so that a slower the moving speed of the moving object is, a greater a number of the first received signals that are modulated into the second received signals having the same frequency, compared to when the moving speed of the moving object is fast.

13. The antenna device according to claim 1, further comprising:
a detecting unit configured to detect the object on a basis of the first received signal,
wherein the plurality of modulating units modulates only the first received signal on the basis of a horizontally polarized component until the detecting unit detects the object using the first received signal of the horizontally polarized component, when the detecting unit detects the object using the first received signal on the basis of the horizontal polarized component, the plurality of modulating units modulates the first received signal of the horizontal polarized component and the first received signal of a vertically polarized component.

14. The antenna device according to claim 1, further comprising:
a transmitter configured to transmit transmission waves to the object,
wherein the antenna element receives electromagnetic waves as the incident waves, the electromagnetic waves coming as the transmission waves transmitted by the transmitter and reflected by the object.

15. An antenna device comprising:
a plurality of first antenna elements respectively configured to receive first incident waves of a predetermined polarization direction coming from an object and respectively configured to output a first received signal on a basis of received first incident waves;
a plurality of second antenna elements respectively configured to receive second incident waves of a polarization direction different from the polarization direction of the first incident waves and respectively configured to output a second received signal on a basis of received second incident waves;
a plurality of first modulating units respectively configured to modulate the first received signal output from a respective first antenna element into a third received signal, such that the third received signal has a first phase and a first frequency which differs from every one of the plurality of first antenna elements;
a plurality of second modulating units respectively configured to modulate the second received signal output from a respective second antenna element into a fourth received signal, such that the fourth received signal has a second phase different from the first phase and a second frequency which differs from every one of the plurality of second antenna elements;
a synthesizing unit configured to synthesize each third received signal modulated by the plurality of the first modulating units and each fourth received signal modulated by the plurality of the second modulating units so as to generate one synthetic signal;
a signal processing unit configured to perform signal processing on the synthetic signal; and
an extracting unit configured to extract fifth received signals from the synthetic signal on which has been performed the signal processing, each of the fifth received signals having a frequency and a phase equal to the frequency and the phase of each third received signal modulated by the plurality of first modulating units and each fourth received signal modulated by the plurality of second modulating units.

16. A signal processing method comprising:
acquiring a plurality of first received signals from a plurality of antenna elements, the plurality of antenna elements receiving incident waves coming from an object, the plurality of antenna elements including at least a first antenna element that receives incident waves of a predetermined polarization direction and a second antenna element that receives incident waves of a polarization direction different from the incident waves received by the first antenna element;
modulating each of the plurality of first received signals into a plurality of second received signal, such that the plurality of second received signal has a frequency corresponding to a position of a respective antenna element in an antenna device and has a phase corresponding to polarization directions of the incident waves received by the antenna element, so that the plurality of second received signals has a plurality of different frequencies each corresponding to a respective position of the respective antenna element in the antenna device and has phases corresponding to the polarization directions of the incident waves received by the respective antenna element;
generating one synthetic signal by synthesizing the plurality of modulated second received signals;
performing signal processing on the synthetic signal; and
extracting third received signals from the synthetic signal on which has been performed the signal processing, each of the third received signals having a frequency and a phase equal to the frequency and the phase of a respective second received signal modulated by the modulating step.

\* \* \* \* \*